United States Patent
Lindbo et al.

(10) Patent No.: US 10,776,750 B2
(45) Date of Patent: Sep. 15, 2020

(54) SYSTEM AND METHOD FOR FULFILLING E-COMMERCE ORDERS FROM A HIERARCHY OF FULFILMENT CENTRES

(71) Applicant: OCADO INNOVATION LIMITED, Hatfield, Hertfordshire (GB)

(72) Inventors: Sverker Lindbo, Hatfield (GB); James Waddilove, Hatfield (GB); Andy Ingram-Tedd, Hatfield (GB); Timothy Deighton Steiner, Hatfield (GB); David Sharp, Hatfield (GB); Evan Innis, Hatfield (GB)

(73) Assignee: OCADO INNOVATION LIMITED, Hatfield, Hertfordshire (GB)

( * ) Notice: Subject to any disclaimer, the term of this patent is extended or adjusted under 35 U.S.C. 154(b) by 465 days.

(21) Appl. No.: 15/523,595

(22) PCT Filed: Nov. 2, 2015

(86) PCT No.: PCT/EP2015/075493
§ 371 (c)(1),
(2) Date: May 1, 2017

(87) PCT Pub. No.: WO2016/066859
PCT Pub. Date: May 6, 2016

(65) Prior Publication Data
US 2017/0323250 A1 Nov. 9, 2017

(30) Foreign Application Priority Data
Oct. 31, 2014 (GB) .................................... 1419498.9

(51) Int. Cl.
*G06Q 10/08* (2012.01)
*G06Q 30/06* (2012.01)

(52) U.S. Cl.
CPC ..... *G06Q 10/087* (2013.01); *G06Q 10/08345* (2013.01); *G06Q 30/0621* (2013.01)

(58) Field of Classification Search
CPC ........... G06Q 10/087; G06Q 10/08345; G06Q 30/0621; B65G 1/1373; B07C 3/003; B07C 2301/00

(Continued)

(56) References Cited

U.S. PATENT DOCUMENTS 6,694,217 B2 * 2/2004 Bloom ................... G06Q 20/00
700/215
6,974,928 B2 * 12/2005 Bloom ...................... B07C 3/00
209/583

(Continued)

OTHER PUBLICATIONS

International Search Report (PCT/ISA/210) dated Dec. 18, 2015, by the European Patent Office as the International Searching Authority for International Application No. PCT/EP2015/075493.

(Continued)

*Primary Examiner* — Andrew Joseph Rudy
(74) *Attorney, Agent, or Firm* — Buchanan Ingersoll & Rooney PC

(57) ABSTRACT

A system and method are disclosed of operating a plurality of fulfillment centres, including a large fulfillment centre and a small fulfillment centre, each of the fulfillment centres being configured to fulfil customer orders. A first product and a second product are received at the large fulfillment centre. Desired quantities of the first and second products are picked at the large fulfillment centre for packing into a container, wherein the desired quantities include at least one of: quantities ordered by at least one customer to be fulfilled at the large fulfillment centre or the small fulfillment centre, and quantities predicted to be ordered by at least one customer and to be fulfilled at the small fulfillment centre.

78 Claims, 16 Drawing Sheets

(58) Field of Classification Search
USPC .................................................. 705/28, 30
See application file for complete search history.

(56) References Cited

U.S. PATENT DOCUMENTS

| | | | | |
|---|---|---|---|---|
| 7,139,637 | B1* | 11/2006 | Waddington | G06Q 10/04 |
| | | | | 700/216 |
| 7,272,613 | B2* | 9/2007 | Sim | H04L 67/1008 |
| | | | | 709/223 |
| 7,370,005 | B1* | 5/2008 | Ham | G06Q 10/06315 |
| | | | | 705/28 |
| 7,653,457 | B2 | 1/2010 | Bloom | |
| 7,860,724 | B2* | 12/2010 | Chudy | G06Q 10/10 |
| | | | | 705/2 |
| 7,987,107 | B2* | 7/2011 | Wilson | G06Q 10/0631 |
| | | | | 705/7.12 |
| 8,335,585 | B2* | 12/2012 | Hansl | B65G 1/1378 |
| | | | | 414/267 |
| 8,407,096 | B2* | 3/2013 | Mathe | G06Q 30/0635 |
| | | | | 705/22 |
| 8,473,425 | B1* | 6/2013 | Maurer | G06Q 10/083 |
| | | | | 705/14.42 |
| 8,620,707 | B1* | 12/2013 | Belyi | G06Q 10/087 |
| | | | | 705/28 |
| 8,718,814 | B1* | 5/2014 | Clark | G06Q 10/08 |
| | | | | 700/214 |
| 8,732,039 | B1* | 5/2014 | Chen | G06Q 10/063 |
| | | | | 705/28 |
| 9,129,335 | B1* | 9/2015 | Norwood | G06F 16/9537 |
| 9,213,953 | B1* | 12/2015 | Kassmann | G06Q 10/0631 |
| 9,632,313 | B1* | 4/2017 | Madan | G06F 3/011 |
| 9,792,578 | B2* | 10/2017 | Dornbush | G06Q 10/087 |
| 9,959,562 | B1* | 5/2018 | Ackerman | G06Q 30/0631 |
| 10,127,514 | B2* | 11/2018 | Napoli | G06Q 10/083 |
| 10,540,621 | B2* | 1/2020 | Qin | G06Q 10/087 |
| 2006/0020366 | A1* | 1/2006 | Bloom | B07C 3/00 |
| | | | | 700/226 |

OTHER PUBLICATIONS

Written Opinion (PCT/ISA/237) dated Dec. 18, 2015, by the European Patent Office as the International Searching Authority for International Application No. PCT/EP2015/075493.

* cited by examiner

SYSTEM AND METHOD FOR FULFILLING E-COMMERCE ORDERS FROM A HIERARCHY OF FULFILMENT CENTRES

The embodiments described herein relate generally to e-commerce, and more particularly to systems and methods for fulfilling orders from a hierarchy of fulfillment centres.

E-commerce solutions exist for a variety of products, allowing customers to order products electronically for delivery.

Some e-commerce solutions are operated from brick-and-mortar stores. For example, in some cases, workers fulfilling orders push trolleys through a brick-and-mortar store among regular customers to pick ordered item for delivery.

However, problems faced by this approach include: (i) high expense resulting from the fact that the cost for picking and delivery are in addition to other costs of operating a store; (ii) workers may be competing for space with regular shoppers; (iii) difficulties managing inventory levels, e.g. to provide availability information; and (iv) difficulties managing perishable items, e.g. by monitoring expiry/use-by dates.

For example, in relation to providing availability information, a regular customer may take the last item before a worker is able to; and in relation to monitoring expiry/use-by dates, some regular customers may select their items from the "back of the shelf". Such events may occur unpredictably.

Other e-commerce solutions are operated from dedicated order fulfillment centres. In some cases, these order fulfillment centres may be approximately the same size as a conventional brick-and-mortar store. Such an order fulfillment centre may be referred to as a "dark store". In other cases, much larger order fulfillment centres may be used. Such larger order fulfillment centres may increase the range of goods that may be offered to customers. However, one drawback of larger order fulfillment centres is that they typically are fewer in number. So, each centre services a larger number of customers, and the average distance to each customer is greater. Transportation time and costs are commensurately higher.

Thus, conventional e-commerce systems typically require trade-offs between parameters associated with fulfillment of orders, such as, e.g. range, convenience, and cost.

Some embodiments of the present disclosure may address some of the noted issues, and may avoid some of the noted trade-offs. Some embodiments of the present disclosure relate to systems and methods that improve one or more parameters associated with the fulfillment of orders, such as, e.g. range, cost and convenience.

In various further aspects, the disclosure provides corresponding systems, methods and devices, and logic structures such as machine-executable coded instruction sets for implementing such systems, devices, and methods.

According to the invention there is provided a method of operating a plurality of fulfillment centres including a large fulfillment centre and a small fulfillment centre, each of the fulfillment centres configured to fulfil customer orders, the method comprising: receiving, at the large fulfillment centre, a first product and a second product; picking, at the large fulfillment centre, desired quantities of the first and second products for packing into a container, wherein the desired quantities include at least one of: quantities ordered by at least one customer, to be fulfilled at the large fulfillment centre or the small fulfillment centre; quantities predicted to be ordered by at least one customer, to be fulfilled at the small fulfillment centre; the method further comprising: storing, at the large fulfillment centre, the first product in a first container; storing, at the large fulfillment centre, the second product in a second container; wherein each of the first and second containers is selected from a set of standardised containers having one or more predefined sizes.

In another aspect, there is provided a system for processing orders to be fulfilled from a plurality of fulfillment centres, including a large fulfillment centre and a small fulfillment centre. The system includes an option selection module, having a processor, configured for: receiving an order; identifying at least two potential options for fulfillment of the order through at least one of the large fulfillment centre and the small fulfillment centre; selecting an option from the at least two potential options by optimising a cost function; and communicating the selected option to one or more logistical systems for fulfillment of the order.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

In the drawings, embodiments of the invention are illustrated by way of example. It is to be expressly understood that the description and drawings are only for the purpose of illustration and as an aid to understanding, and are not intended as a definition of the limits of the invention.

Embodiments will now be described, by way of example only, with reference to the attached figures, wherein.

Figure 1:
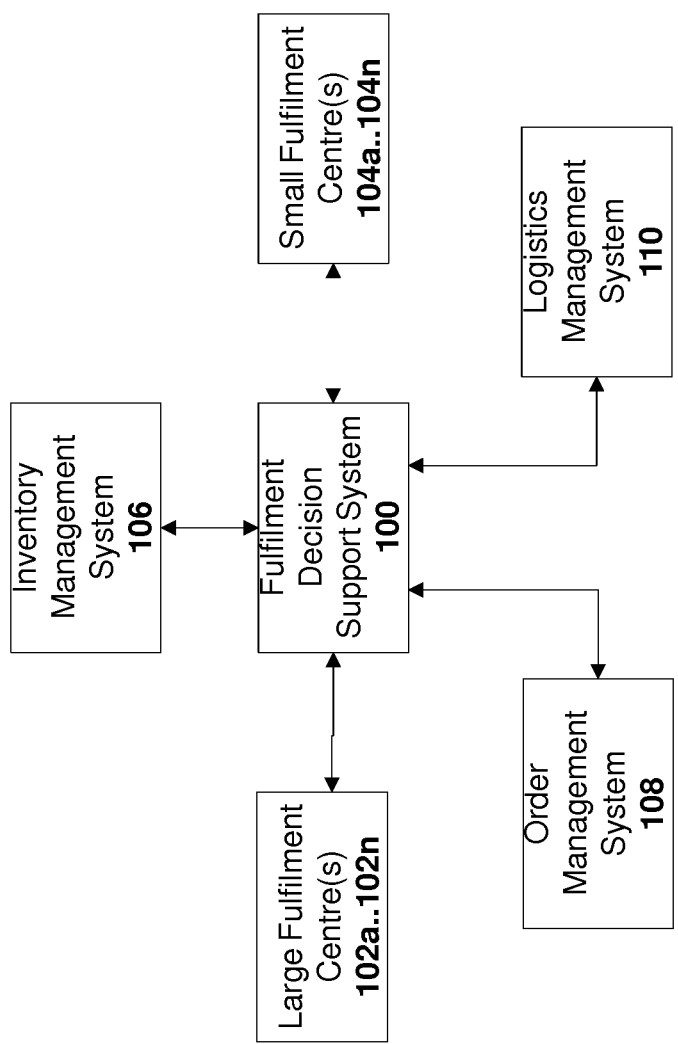
FIG. 1 is a block schematic diagram of a logistics arrangement, according to some embodiments.

Example embodiments of methods, systems, and apparatus suitable for use in implementing embodiments of the invention are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The present disclosure, in one aspect, provides methods, systems and/or computer program products for fulfilling orders from a hierarchy of fulfillment centres. Some embodiments of these methods and systems require full or partial implementation involving electronic and/or computer-related means, wherein practical implementation cannot be conducted through purely manual, mental or otherwise disembodied steps.

In some embodiments, systems may be provided in association with a hierarchy of fulfillment centres from which orders may be fulfilled. There may be various tiers of fulfillment centres, some of which may have different sizes, operational characteristics, logistics channels, etc.

The hierarchy of fulfillment centres may include one or more large fulfillment centres. In some embodiments, a large fulfillment centre may be 20-40 times larger than a large brick-and-mortar store and at least 10 times larger than a "dark store". A large fulfillment centre may provide benefits. For example, a large fulfillment centre may hold a large range of goods and its larger scale may more readily facilitate automation. The large fulfillment centre may also handle sufficient volumes to receive frequent deliveries from manufacturers and processing plants, thus potentially bypassing an often expensive and time consuming step in a conventional supply chain.

The hierarchy of fulfillment centres may also include a plurality of smaller fulfillment centres. A small fulfillment centre may be located closer to customers and thus offer short order lead times. If a fulfillment centre is close enough, customers may collect orders directly from the fulfillment centre.

The hierarchy of fulfillment centres may include yet other types of centres, such as customer pickup points, vehicle reloading points, etc.

Embodiments of systems disclosed herein may be configured and operated in manners that combine the high productivity and capital efficiency of large fulfillment centres with the proximity and short lead times of small fulfillment centres.

Such a system may be configured for providing a combination of fulfillment centres of various sizes for improved (e.g. more efficient, more timely, more cost-effective, etc.) fulfillment of orders compared to conventional approaches.

For example, a system may be configured for compliance with lean principles, just-in-time inventory control, etc. The system may be configured to provide logistics decision support and/or automatically enact logistics actions based on the optimisation of costs associated with various factors, such as labour costs, delivery costs, capacity costs, opportunity costs, etc.

In some embodiments, a system may also be configured for providing logistics decision support and/or enacting logistics actions predictively. For example, given an aggregate number of orders and data reflective of expected customer demand for particular good, a number of orders may be predicted, and the predicted orders may be determined to be more effectively fulfilled from a particular fulfillment centre (e.g. a small fulfillment centre). When those goods are not available in sufficient quantities at that particular fulfillment centre, the system may cause at least some of the goods to be shipped to the particular fulfillment centre in advance of the predicted orders.

By way of example, there may be spare capacity on a transport truck (or a particular container on the truck) scheduled to travel from a large fulfillment centre to a small fulfillment centre, and therefore the marginal cost of transporting said items to the small fulfillment centre may be determined to be low.

By way of another example, there may be spare storage capacity at a small fulfillment centre, and therefore the marginal cost of storing items at the small fulfillment centre may be determined to be low.

By way of another example, there may be spare labour capacity (e.g. picking/packing capacity) at a fulfillment centre, and therefore the marginal cost of picking/packing items for fulfilling an order or picking/packing items for distribution to another fulfillment centre in anticipation of a predicted order may be determined to be low.

Conversely, shortfalls in availability of transport capacity, storage capacity, labour capacity, etc., may cause the associated costs to be high.

By way of another example, it may be advantageous to partially pick customer orders. For example, part of a customer order may be picked and fulfilled at a large fulfillment centre, and the partially picked order, contained in one of a predetermined number of standardised containers, transferred to a small fulfillment centre to pick the remainder of the order.

Some or all of the remainder of the order may be picked into the transferred standardised containers that already contain the subset of items in the customer order already picked at the large fulfillment centre.

By way of yet another example, it is an advantage of the system and method described below that the standardisation of the containers allows for a single decant of incoming inventory items. The items subsequently being transferred between fulfillment centres in standardised containers.

By way of yet another example, it is an advantage of the present system and method described that different categories of inventory items may be decanted and picked at designated fulfillment centres, said fulfillment centres being selected based on the capability and equipment located at said centres. For example, robotic picking and/or decanting of inventory items may require specific robotic picking, decanting and handling devices. Therefore each fulfillment centre may be provided with only a given type of robotic picker capable of only picking a subset of inventory items. The system detailed herein allows for the selection of fulfillment centre based on said equipment being available at that centre.

All such example costs, and other costs detailed herein, may be taken into account by the logistics functions of the presently disclosed embodiments.

There may be commercial advantages in these embodiments, such as the ability to utilise otherwise unutilised or under-utilised capacity, the ability to intelligently make logistics decision based on a variety of different information sources, the ability to make logistics decisions to efficiently meet anticipated demand, and/or the ability to factor opportunity costs into decision making.

Overview

FIG. 1 is a block schematic diagram of a logistics arrangement, according to some embodiments. The logistics arrangement may include a fulfillment decision support system 100, one or more large fulfillment centres 102*a*, 102*n*, one or more small fulfillment centres 104*a*, 104*n*, an inventory management system 106, an order management system 108 and a logistics management system 110.

These various systems and/or centres may communicate among one another, communicating information such as current status, inventory status, etc. Interconnections between systems may comprise an application programming interface (API) that provides a communications means between various machines. An API may be implemented via various technologies, such as Simple Object Access Protocol (SOAP), interfaces developing through exposing functionality using programming code, representational state transfer (REST adhering programming techniques), etc. Communications may also occur over one or more networks. The one or more networks may include the internet, intranets, point to point networks, etc. Networking technology may include technologies such as TCP/IP, UDP, WAP, etc. Information may be communicated between the systems in various formats. For example, the information could be provided as portable document format files (PDF), comma-separated values (CSV), Microsoft Excel™ documents, extensible markup language (XML), hypertext markup language (HTML) or simply scanned and/or physical documents.

The fulfillment decision support system 100 may be configured for the supporting logistical decisions in relation to the fulfillment of orders and/or the automatic provisioning of instructions related to logistical decisions. The fulfillment decision support system 100 may receive inputs from various sources, in relation to historical, current, future and/or anticipated product orders. The inputs may also include information relating to physical logistics, such as, e.g. the status and/or positioning of transport equipment, traffic congestion on various routes, etc. The inputs may also include information relating to customer preferences, such as, e.g. tolerance for delivery speed, delivery time-of-day, preference for home delivery or customer pickup, preferred pickup points, etc.

In some embodiments, one or more customer profiles may be generated and/or maintained, and customer preferences may be determined through various analytical methods. Customer preferences, order history, and/or anticipated orders may be taken into consideration in supporting fulfillment decisions.

The fulfillment decision support system 100 may be configured for prioritizing various options based on a set of rules; recommending options; conducting statistical analysis and reporting; and/or automatically selecting logistical options based on the application of a set of rules.

It may be possible to fulfil some customer orders from one or more large fulfillment centres 102*a*, 102*n* or one or more small fulfillment centres 104*a*, 104*n*. The fulfillment decision support system 100 may be configured to select between one or more fulfillment options. The selection may be based, at least in part, on optimising a cost function associated with the fulfillment options. This may provide for potential cost-savings and/or other optimisations, as further detailed below.

In some embodiments, the fulfillment decision support system 100 may be configured for determining opportunities to move goods pre-emptively between large fulfillment centres 102*a*, 102*n* and small fulfillment centres 104*a*, 104*n*. For example, if there is expected demand from customers near a small fulfillment centre 104*a*, the fulfillment decision support system 100 may be configured to issue commands and/or recommendations to move product pre-emptively to the small fulfillment centre 104*a* in anticipation of customer orders. Potential advantages may include the ability to offer a greater selection to customers, a faster delivery time (which may be particularly important in relation to perishable goods), reduced costs, higher sales margins, etc.

In particular, the fulfillment decision support system 100 may be configured to utilize information from a customer's purchase and web browsing history to calculate where additional sales and/or higher margins can be achieved by having a set of desired logistical characteristics, such as having a larger range of items available at short lead times.

The information may be utilized and/or received by algorithms that optimise the range for a given location and time.

Other types of information may also be utilized, such as items on wish lists, electronic shopping carts, responsiveness to sale pricing, demographic information, seasonal information, event based information, customer reviews, upcoming promotions, etc.

The fulfillment decision support system 100 may also be configured to cause the sending of products from the small fulfillment centres to other fulfillment centres, large fulfillment centres or other small fulfillment centres. For example, where a number of products are being held at a small fulfillment centre that could be more effectively and/or advantageously fulfilled elsewhere, the fulfillment decision support system 100 may cause the product to be moved to another fulfillment centre. Similarly, products may also be moved from the small fulfillment centre in anticipation of future orders elsewhere.

In some embodiments, the fulfillment decision support system 100 may also cause some perishable items to be returned from the small fulfillment centre to the large fulfillment centre. This may be desirable, for example, when an item is not predicted to sell for several days at the small fulfillment centre while it would be sold much sooner from the large fulfillment centre, and when such an item is more valued by the customer when the item has more useable days of product life.

In some embodiments, the fulfillment decision support system 100 may be configured for machine learning techniques based on information gathered over time. For example, the fulfillment decision support system 100 may be configured to analyse prior logistical decisions to automatically refine or adapt decision algorithms. For example, co-efficients may be used to weigh various factors, and the co-efficients may be modified over time to aid decisions recommended by the fulfillment decision support system 100.

The large fulfillment centres 102*a*, 102*n* and small fulfillment centres 104*a*, 104*n* are provided as examples of a hierarchical arrangement of fulfillment centres. In some embodiments, the sizes of fulfillment centres are not limited to small and large, and there may be other sizes of fulfillment centres having various capabilities.

The fulfillment centres may, for example, be able to receive shipments from suppliers, interoperate with various transportation links/vehicles, fulfil customer orders directly (e.g. customer picks up order or order is shipped to customer directly from the fulfillment centre), fulfil customer orders indirectly (e.g. an inventory item is shipped indirectly from the fulfillment centre to the customer by way of another fulfillment centre), etc. When customer orders are fulfilled indirectly, an order may be fulfilled using goods from multiple fulfillment centres.

The large fulfillment centres 102*a*, 102*n* and the small fulfillment centres 104*a*, 104*n* can be used to fulfil home delivery orders and to prepare orders for customer pickup. The large fulfillment centres 102*a*, 102*n* and the small fulfillment centres 104*a*, 104*n* may potentially include various mechanised and/or otherwise automated solutions for the picking, packing, unpacking, loading, and unloading of containers containing goods.

In some embodiments, there may also be other types of fulfillment centres, such as a pickup point, where customers may make orders, and orders may be fulfilled through shipment of the goods to the pickup point.

The large fulfillment centre(s) 102*a*, 102*n* may be larger in physical size than the small fulfillment centres 104*a*, 104*n*. So, the large fulfillment centre(s) 102*a*, 102*n* may store a larger range of goods than the small fulfillment centres 104*a*, 104*n*.

The large fulfillment centre(s) 102*a*, 102*n* may have various capabilities associated with logistics and supply chain needs, such as a high level of automation and/or mechanised processes. The larger fulfillment centres may also be operated for a greater number of hours per day, and may be operated in conjunction with larger transport vehicles.

The small fulfillment centres 104*a*, 104*n* may be smaller in size, carry a reduced selection/inventory of items, and be more geographically diverse in location. The small fulfillment centres 104*a*, 104*n* may also be more advantageously located relative to customers, and also may be located in more premium locations (e.g. locations with high customer traffic) where the costs of operation and/or the costs of inventory space may be higher.

A variety of transport vehicles may be used for the transporting of goods between fulfillment centres, to customers, from suppliers, to suppliers, etc. These transportation links may be of various types, such as automobiles, trucks, trains, ferries, airplanes, helicopters, couriers, etc. There may be transport vehicles of differing capabilities, capacities, limitations, sizes and/or operational costs. In some embodiments, some transport vehicles also have additional equipment suitable for various capabilities, such as refrigeration, air cushioning, vibration resistance, hazardous chemical transportation, etc.

Products provided by suppliers may come in containers having a large quantity of homogeneous items. Such containers may be standardised containers, which may be adapted for ready storage, transport, and/or to interface with automated systems of fulfillment centres (e.g. for picking, packing, etc.). An issue may arise in providing such containers to small fulfillment centres where the homogeneous items are items which are slow sellers. For example, if storage space is at a premium at the smaller fulfillment centre, inventory space that could otherwise be used for storing other goods may be taken up by a non-optimal number of the slow seller items. So, as further detailed below, goods may be repackaged at a large fulfillment centre into standardised containers containing a heterogeneous mix of items prior to transport to a small fulfillment centre.

In some embodiments, the goods may be initially received at a large fulfillment centre 102*a*, 102*n*. The goods may be received in standardised containers, or the goods may be received otherwise (e.g. on pallets) and transferred into standardised containers upon arrival at a large fulfillment centre 102*a*, 102*n*. Goods may be sorted into various containers for storage at the large fulfillment centre. For example, a first product may be sorted into a first container for storage, while a second product may be sorted into a second container for storage.

Standardised containers may be provided in one or more predefined sizes. Conveniently, the use of standardised containers having predefined sizes may allow the containers to be readily manipulated by a mechanised storage and retrieval system provided at a large fulfillment centre in accordance with some embodiments. In some embodiments, there may be a similar mechanised storage and retrieval system provided at a small fulfillment centre or a collection point.

In some embodiments, a mechanised storage and retrieval system may include a plurality of inventory management devices adapted to manipulate inventory, e.g. as part of various inventory management processes performed at a fulfillment centre, e.g. a pick process, a pack process, a sort process, a space optimization process, etc. So, an inventory management device may be configured to manipulate (e.g. move, load, unload, retrieve, carry, rotate, roll, dock, undock, lift, or otherwise handle) containers, groups of containers, or goods contained therein.

For example, the inventory management device may be configured to move a container from one location in a fulfillment centre to another location in the fulfillment centre. In an embodiment, one or more of the inventory management devices may be devices configured to autonomously move through a fulfillment centre, and thereby move a container. The one or more inventory management devices may also be automated for other types of tasks and/or actions (e.g. docking with containers, undocking with containers, lifting containers, interfacing with containers, transferring containers to other types of equipment).

In some embodiments, the standardised containers may be configured to interface with one or more of the inventory management devices. For example, the standardised containers may include various structural features, such as recesses, protrusions, fastening mechanisms, securing mechanisms, rollers, electrical connections, etc. that may be utilized for interfacing with the inventory management devices, for manipulation thereby.

In some embodiments, the standardised container may also be housed in a container holding one or more standardised containers, which may be configured for interaction with one or more of the inventory management devices. For example, a number of standardised containers may be placed into a single container and moved together by an inventory management device.

In some embodiments, the standardised containers may be stacked and moved together. The standardised containers may also be configured for securing with one another.

In some embodiments, a container used to transfer goods to the small fulfillment centres 104*a*, 104*n* may be selected from a set of standardised containers of at least one predefined size. So, in one example workflow, goods may be picked from one or more standardised containers for packing into other standardised container(s).

Conveniently, the use of standardised containers having predefined sizes may allow the containers to be readily manipulated by a mechanised storage and retrieval system provided at a small fulfillment centre in accordance with some embodiments. These standardised containers may interface with one or more of the inventory management devices provided as part of the mechanised storage and retrieval system at a small fulfillment centre, e.g. to be manipulated at the small fulfillment centre. For example, a standardised container transported from a large fulfillment centre to a small fulfillment centre may be moved by a inventory management device upon receipt at the small fulfillment centre.

Items may be transferred to small fulfillment centres 104a, 104n in response to an order made by a customer, and/or in anticipation of a predicted future order, for example, to maintain an attractive range of products available at a small fulfillment centre.

In some embodiments, the system may also be configured to supply some products, such as certain perishable items (e.g. fresh bread), directly from suppliers to the small fulfillment centres 104a, 104n.

The inventory management system 106 may be configured for generating, updating and/or otherwise storing information related to inventory, such as inventory levels, SKU (stock keeping unit) numbers, inventory status, inventory rules (e.g. expiry dates, fragile goods, hazardous materials), reservations, inventory location, etc. In some embodiments, the inventory management system 106 may be configured for communication with supplier systems to determine future state inventory information, as well as to receive information in related to anticipated shipments or deliveries from suppliers.

The order management system 108 may be configured for generating, updating and/or otherwise storing information related to customer orders, such as product, delivery location and delivery time window. In some embodiments, the order management system 108 may be configured to predict future orders based on various indicia, such as historical ordering information, promotional campaigns, introductions of new products, extrapolation from pre-orders, etc. In some embodiments, the order management system 108 may determine appropriate substitutions for items in a customer's order.

The logistics management system 110 may be configured for generating, updating and/or otherwise storing information related to transportation links and/or transportation vehicles, such as transportation costs, available capacity, available capabilities, traffic congestion, availability of vehicles, fuel costs, insurance costs, driver costs, available transport linkages (e.g. an available truck loading dock at a large fulfillment centre), etc.

The fulfillment decision support system 100 may comprise one or more servers having one or more processors, operating in conjunction with one or more computer-readable storage media, configured to provide backend services, such as data processing, data storage, data backup, data hosting, among others.

In some embodiments, the fulfillment decision support system 100 is a set of distributed computing devices connected through a communications network. An example of such a set of distributed computing devices would be what is typically known as a 'cloud computing' implementation. In such a network, a plurality of connected devices operate together to provide services through the use of their shared resources.

A cloud-based implementation for processing and analysing logistical options may provide one or more advantages including: openness, flexibility, and extendibility; manageable centrally; reliability; scalability; being optimised for computing resources; having an ability to aggregate information across a number of sources; and an ability to connect across a number of systems.

While embodiments and implementations of the present invention may be discussed in particular non-limiting examples with respect to use of the cloud to implement aspects of the system platform, a local server, a single remote server, a software as a service platform, or any other computing device may be used instead of the cloud.

Order Picking/Mixed Container Picking

Figure 2:
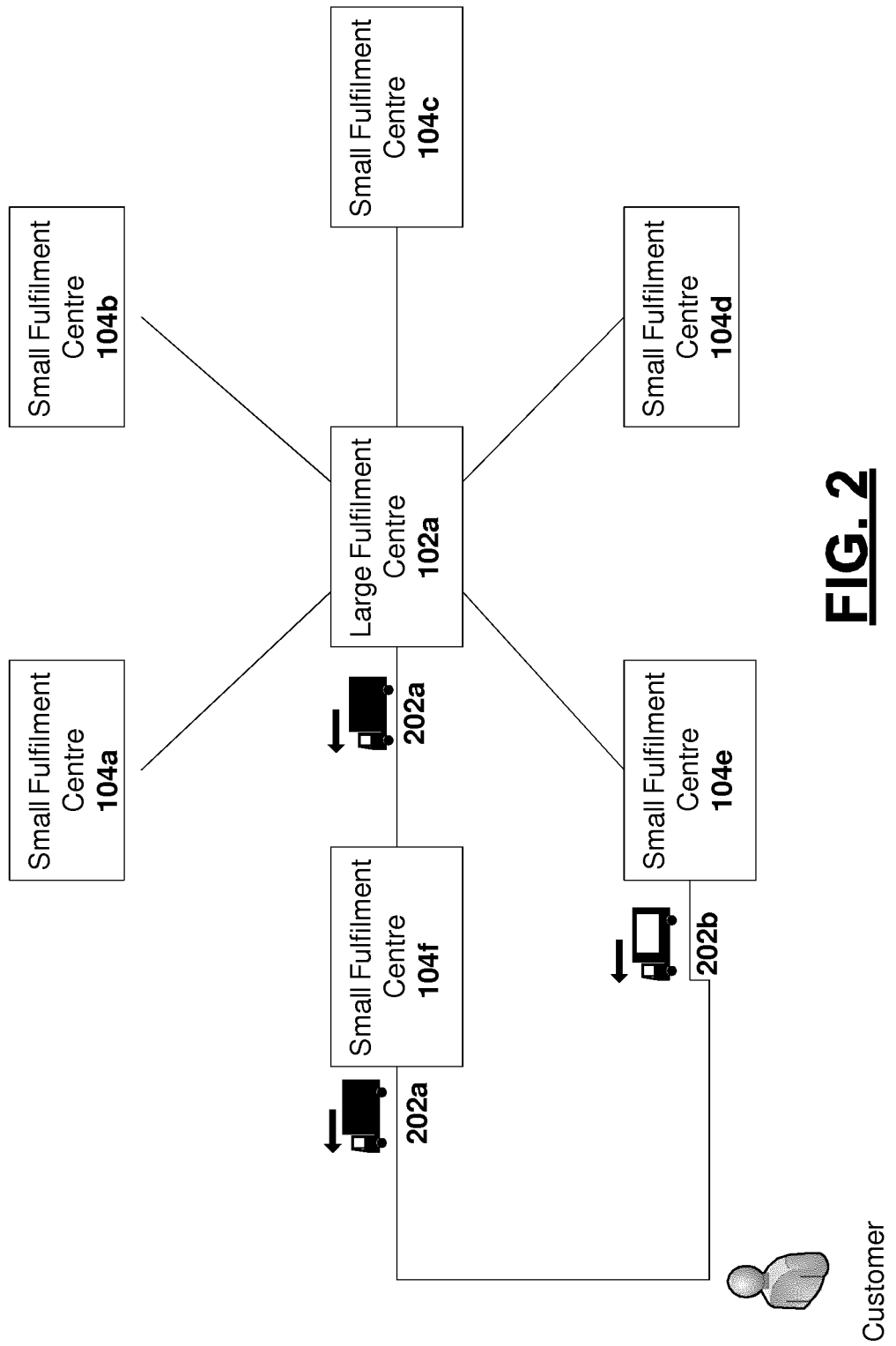
FIG. 2 is a schematic diagram of a large fulfillment centre that is connected to a number of small fulfillment centres, according to some embodiments.

FIG. 2 is a schematic diagram of a large fulfillment centre 102a that is connected to small fulfillment centres 104a, 104b, 104c, 104d, 104e, and 104f. This diagram shows fulfillment of an example customer order, in accordance with some embodiments.

In the depicted embodiment, the large fulfillment centre 102a and the small fulfillment centres 104a, 104b, 104c, 104d, 104e, and 104f are arranged and interconnected according to a star (hub-and-spoke) topology. In other embodiments, other topologies are also possible, such as, e.g. a ring topology, a tree topology, a bus topology, a grid topology, etc. The fulfillment centres may also be fully connected such that goods may be transferred from any fulfillment centre to any other fulfillment centre.

As depicted, there may be at least two options available to fulfil the customer's order: (1) through truck 202a, providing the item from a large fulfillment centre 102a, or (2) sending an order directly from inventory held at small fulfillment centre 104e using truck 202b. However, truck 202a may already be en route to small fulfillment centre 104f and/or to drop off products in the vicinity of the customer. Small fulfillment centre 104e may be more geographically proximate to the customer, but an empty truck 202b would have to be provisioned.

In this example, a non-trivial decision needs to be made between the fulfillment options. The fulfillment decision support system 100 may be configured to take into consideration inputs from a variety of sources, any logical constraints on options and determine which option would be optimal. Optimisation may be conducted in view of a variety of desired outcomes, such as cost, environmental footprint, responsiveness to customer orders, etc.

In the depicted example, upon performing this optimisation, it may be determined to send the customer's order from large fulfillment centre 102a, even though small fulfillment centre 104e may be more geographically proximate to the customer.

At some point in time, the options may also narrow in view of various constraints. For example, it may become too late to fulfil an order from a large fulfillment centre 102a, because it is located too far away. In another example, it may become too late to use a certain vehicle, because the vehicle has already left. At the time the decisions have to be made, information may not be perfect, but, in some embodiments, the system 100 may be configured such that it will be possible to refine the probabilities with new information up to a deadline.

Figure 5:
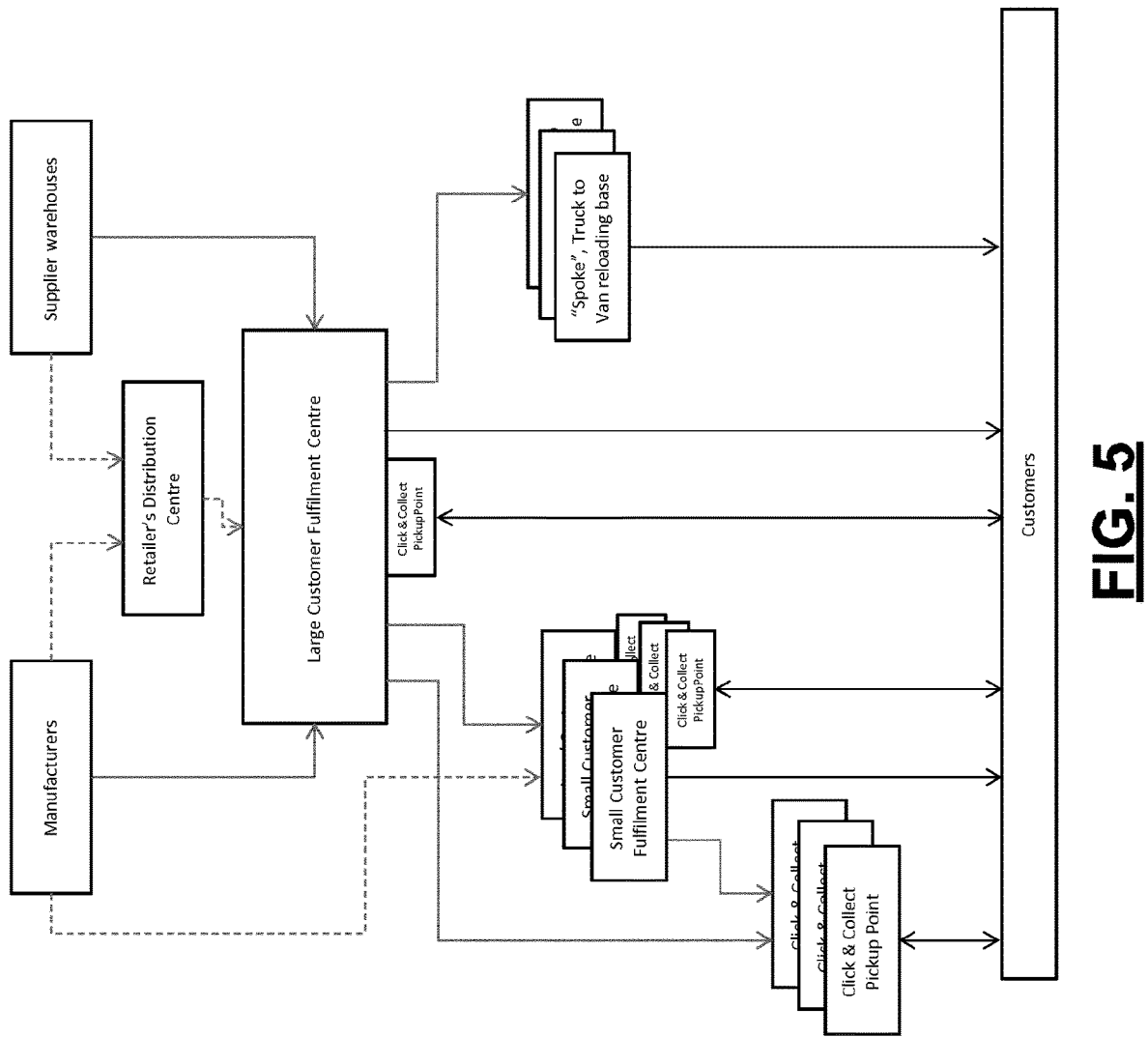
FIGS. 5, 9 and 10 are schematic diagrams of various arrangements of hierarchies having different types of fulfillment centres and/or pickup points that may provide various logistical options in the fulfillment of a customer order, according to some embodiments.
Figure 9:
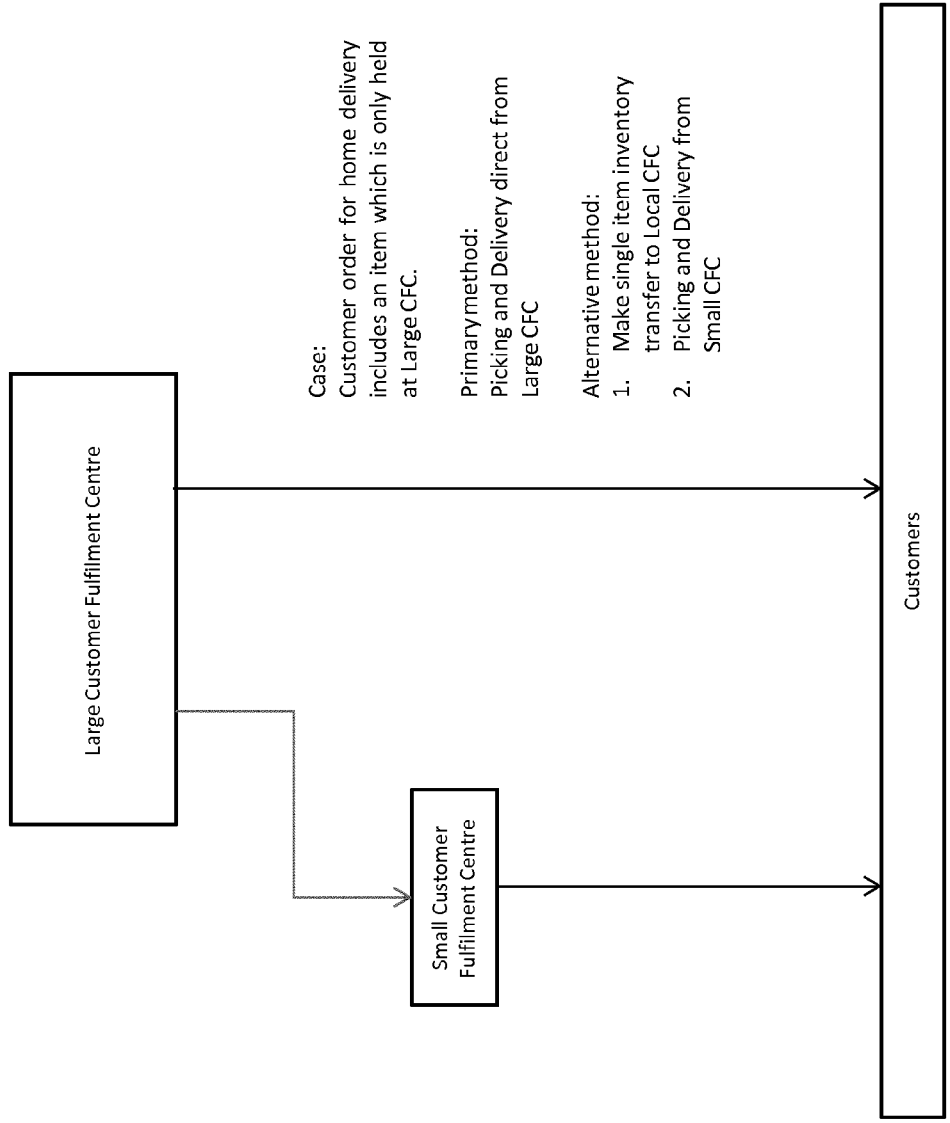
Figure 10:
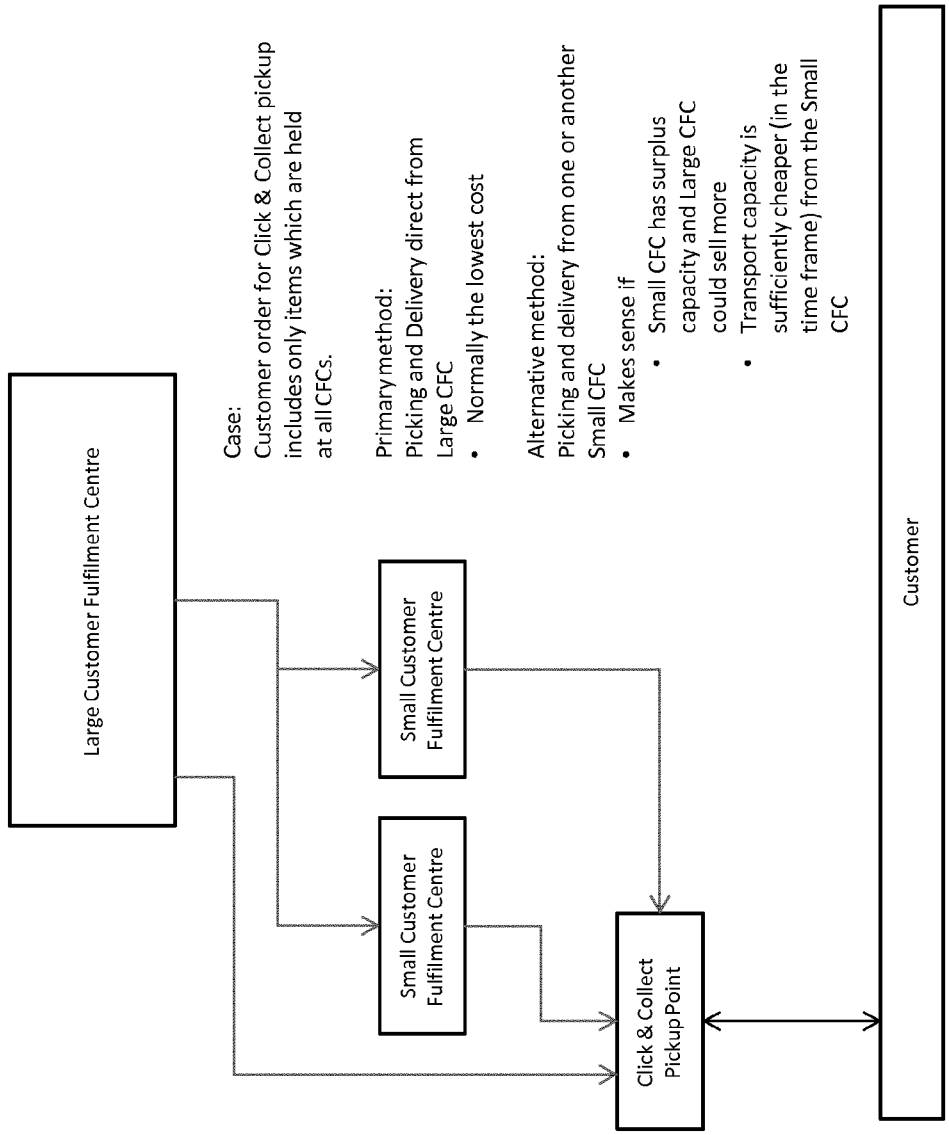

FIGS. 5, 9 and 10 are schematic diagrams of various arrangements of hierarchies having different types of fulfillment centres and/or pickup points that may provide various logistical options in the fulfillment of a customer order, according to some embodiments.

Order Picking/Mixed Container Picking

Figure 3:
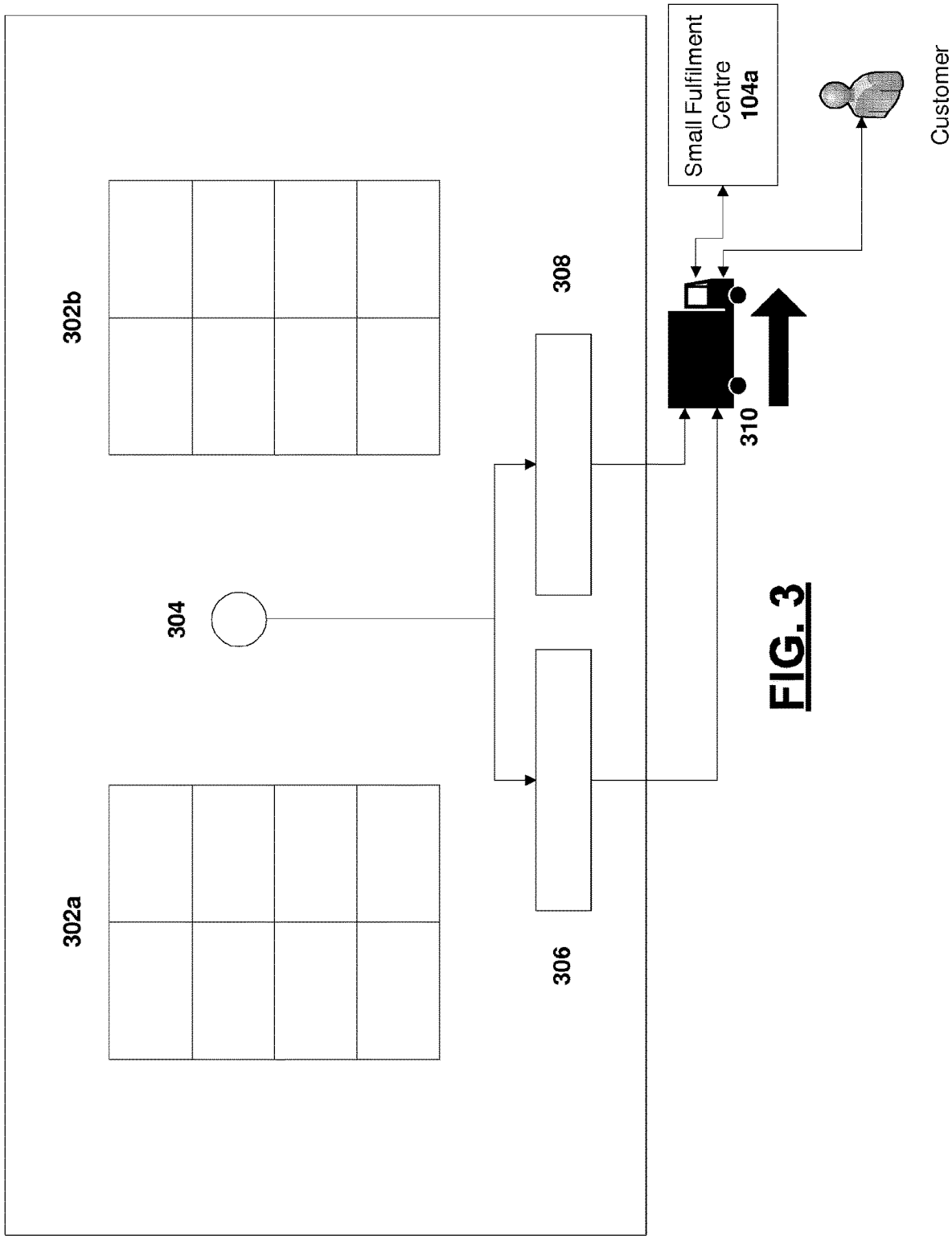
FIG. 3 is a schematic of a large fulfillment centre having product picking capabilities, according to some embodiments.

FIG. 3 is a schematic diagram of a large fulfillment centre having product picking capabilities, according to some embodiments. The large fulfillment centre(s) 102a may include picking stations 302a and 302b, agents 304 for transporting containers, packing stations 306 and 308 for providing containers onto truck 310. Truck 310 may provide the container to either a small fulfillment centre 104a or directly to a customer.

In some embodiments, upon intake of products, the large fulfillment centre(s) 102a, 102n may be configured to receive the products in containers/pallets containing products of a single type (e.g. a container carrying a products having the same SKU #).

For distribution of goods to one or more small fulfillment centres 104a, 104n, e.g. in anticipation of predicted orders, there may be greater efficiency if containers carrying a mixed assortment of goods (having different SKU #) is provided to the small fulfillment centres 104a, 104n instead of containers carrying homogeneous goods. For example, a small fulfillment centres 104a, 104n may only sell 1-2 of a particular good a month, and it may not be desirable to provide a small fulfillment centre 104a with a container having 15 of the particular good, especially if inventory space is scarce at the small fulfillment centre 104a.

So, containers carrying a mixed assortment of goods may be provided at the one or more large fulfillment centres 102a, 102n for distribution to the one or more small fulfillment centres 104a, 104n. The particular quantity of each product in a container destined for a particular small fulfillment centre 104a, 104n may be based on expected demand for that product from customers proximate the destination fulfillment centre, availability of storage at the destination fulfillment centre (aggregate or for a particular product type), and so on. The selection of goods may be optimised according to the various criteria detailed elsewhere in this disclosure.

Accordingly, goods with sufficient sales, in relation to item size, date life and availability of storage space at the small fulfillment centres 104a, 104n may be transferred in single-product containers, and other goods may be transferred in containers carrying multiple products.

The provisioning of containers carrying mixed goods to small fulfillment centres 104a, 104n may require the use of picking capabilities to pick items from standardised containers carrying only goods of one type for packing in standardised containers carrying mixed goods.

As the large fulfillment centre(s) 102a, 102n may have pre-existing picking stations 302a and 302b for picking products into containers for actual customer orders, these picking stations 302a and 302b may also be utilised for picking products into containers carrying mixed products for transporting to small fulfillment centres 104a, 104n in anticipation of predicted orders.

As noted, in some embodiments, picking may be performed by a mechanised storage and retrieval system provided at the large fulfillment centre. For example, containers may be moved from a storage location to a packing station 306 by one or more inventory management devices of the mechanised storage and retrieval system.

Conveniently, containers for actual customer orders and containers for predicted orders may be picked alongside each other using the same picking process.

In some cases, a single container may contain products for an actual customer order and products for a predicted order.

Workflows

Figure 6:
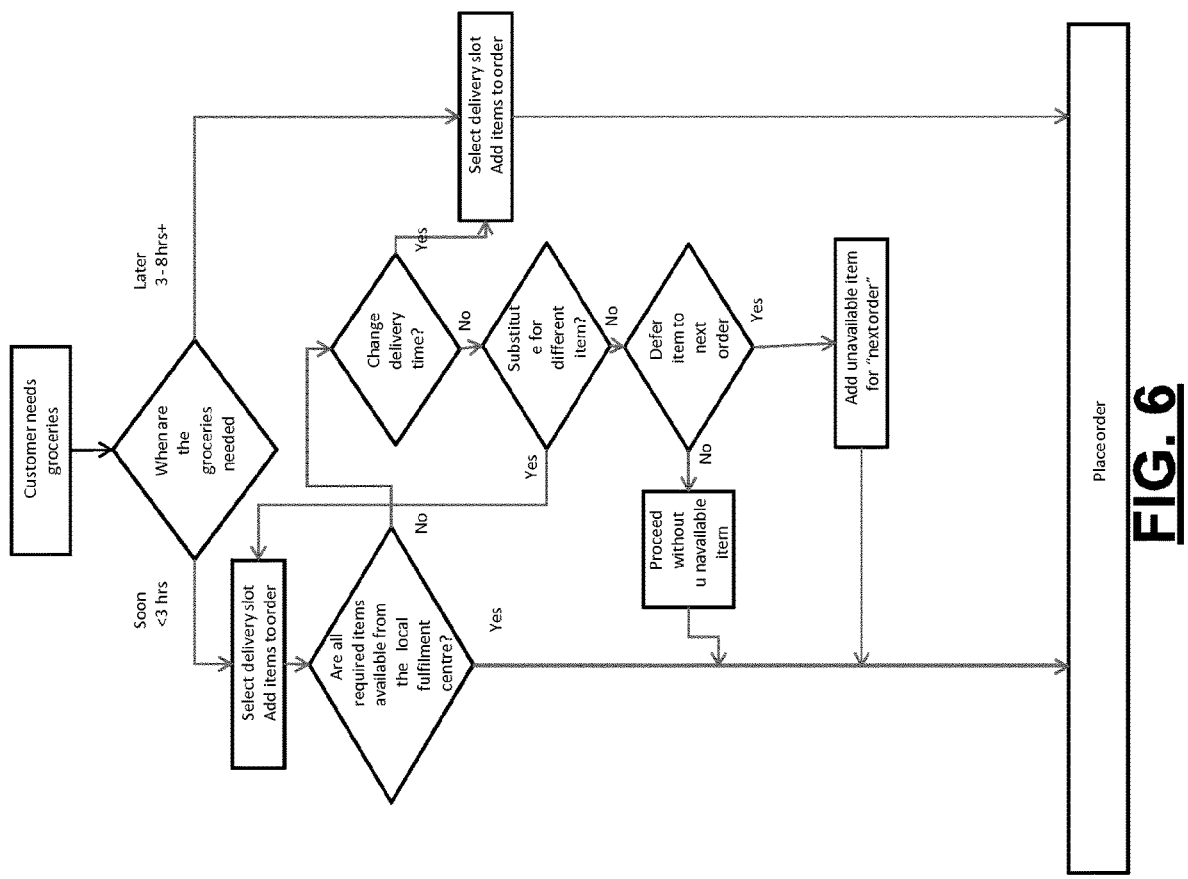
FIG. 6 is a flow chart showing the decisions a customer could make, according to some embodiments.

FIG. 6 is a flow chart showing the decisions a customer could make, according to some embodiments.

Figure 7:
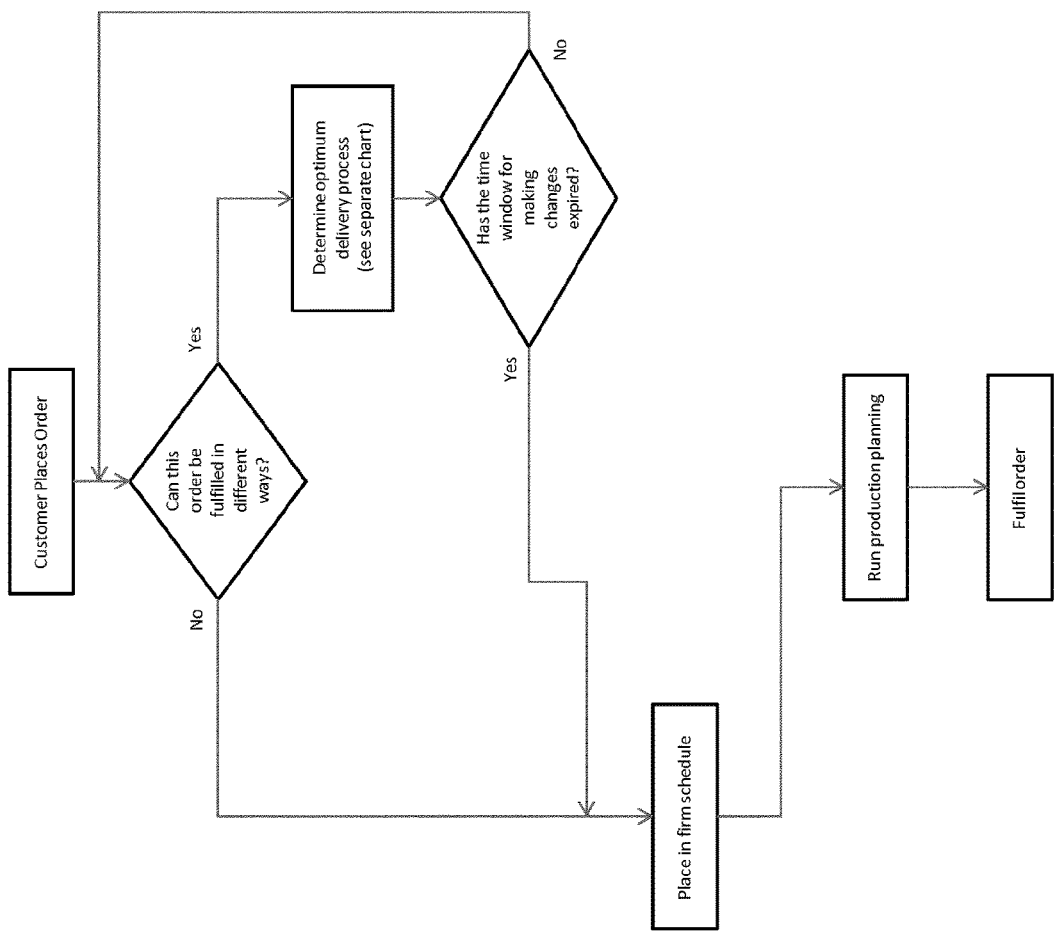
FIG. 7 is a flow chart showing the steps that may be taken in fulfilling the customer's order, according to some embodiments.

FIG. 7 is a flow chart showing the steps that may be taken in fulfilling the customer's order, according to some embodiments.

Fulfillment Decision Support System

Figure 4:
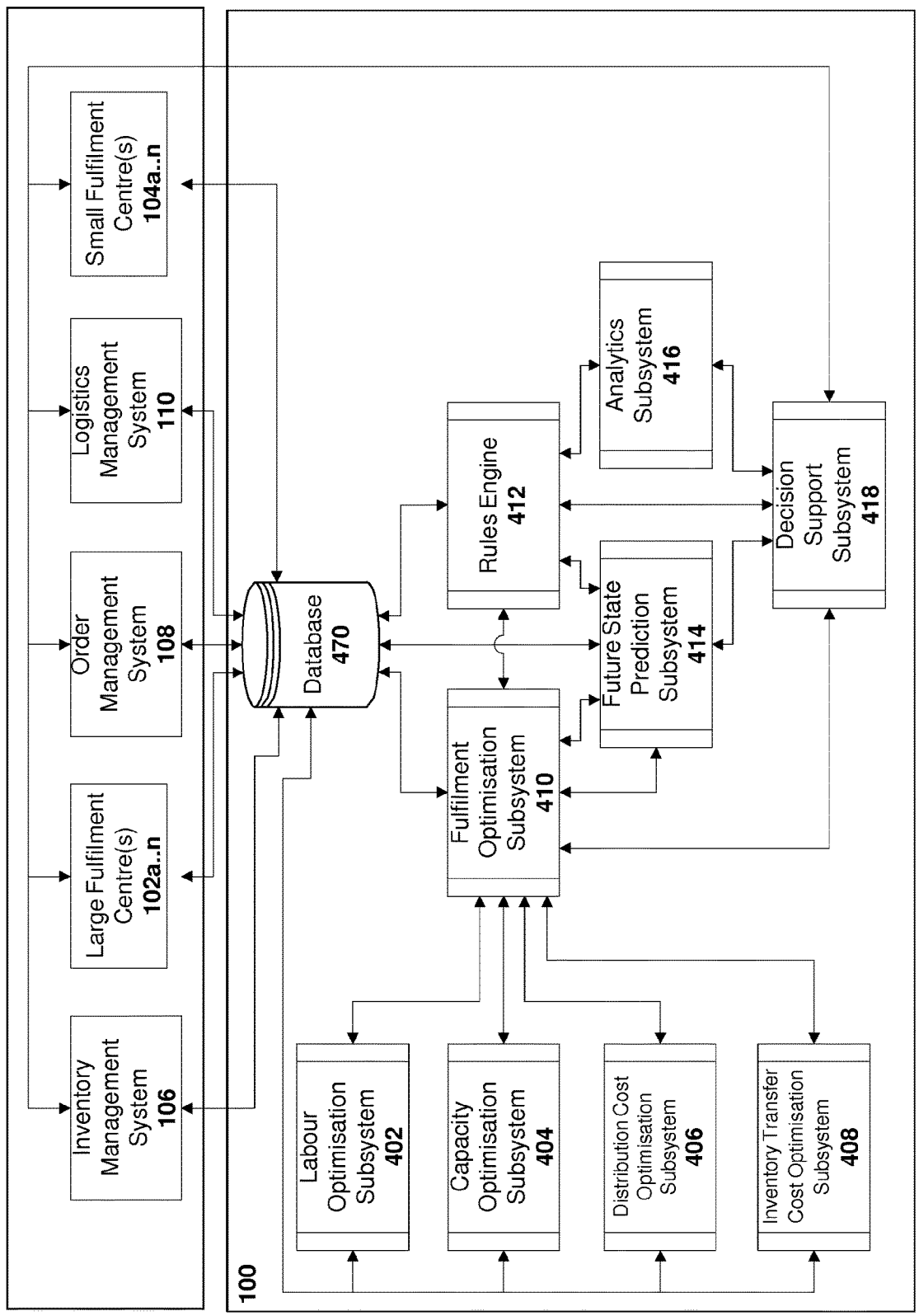
FIG. 4 is a schematic diagram of a fulfillment decision support system, according to some embodiments.

FIG. 4 is a schematic diagram of a fulfillment decision support system, according to some embodiments. The fulfillment decision support system 100 may include a labour optimisation subsystem 402, a capacity optimisation subsystem 404, a distribution cost optimisation subsystem, an inventory transfer cost optimisation subsystem, a fulfillment optimisation subsystem 410, a rules engine 412, a future state prediction subsystem 414, an analytics subsystem 416, a decision support subsystem 418, and a database 470.

The fulfillment decision support system 100 may be configured for prioritizing various options based on a set of rules; recommending fulfillment options; conducting statistical analysis and reporting; and/or automatically selecting logistical options based on the application of a set of rules. The fulfillment decision support system 100 may also be configured for interaction with one or more large fulfillment centres 102a, 102n, one or more small fulfillment centres 104a, 104n, an inventory management system 106, an order management system 108 and a logistics management system 110. For example, information from these systems may be stored, updated and/or otherwise modified in database 470.

The database 470 may be implemented using various database technologies, such as relational databases (e.g. SQL databases), NoSQL databases, flat databases, Microsoft Excel™ spreadsheets, comma separated values, etc. If the database 470 is implemented using relational database technology, the database 470 may be configured to further store relationships between various data records. The database 470 may be implemented using various hardware of software technologies, such as solid state or hard disk drives, redundant arrays of independent disks, cloud storage, virtual storage devices, etc.

The fulfillment decision support system 100 may be configured to automatically or semi-automatically provide optimisations (such as prioritization of options, recommending of options, automatic provisioning of actions, reserving of logistical elements, etc.) for various parameters and variables (e.g. cost, freshness of goods, potential travel risk, availability of transport capacity, responsiveness to customer orders, availability of specialised equipment [such as refrigerated trucks], order priority, distance traveled, carbon emissions).

Figure 8:
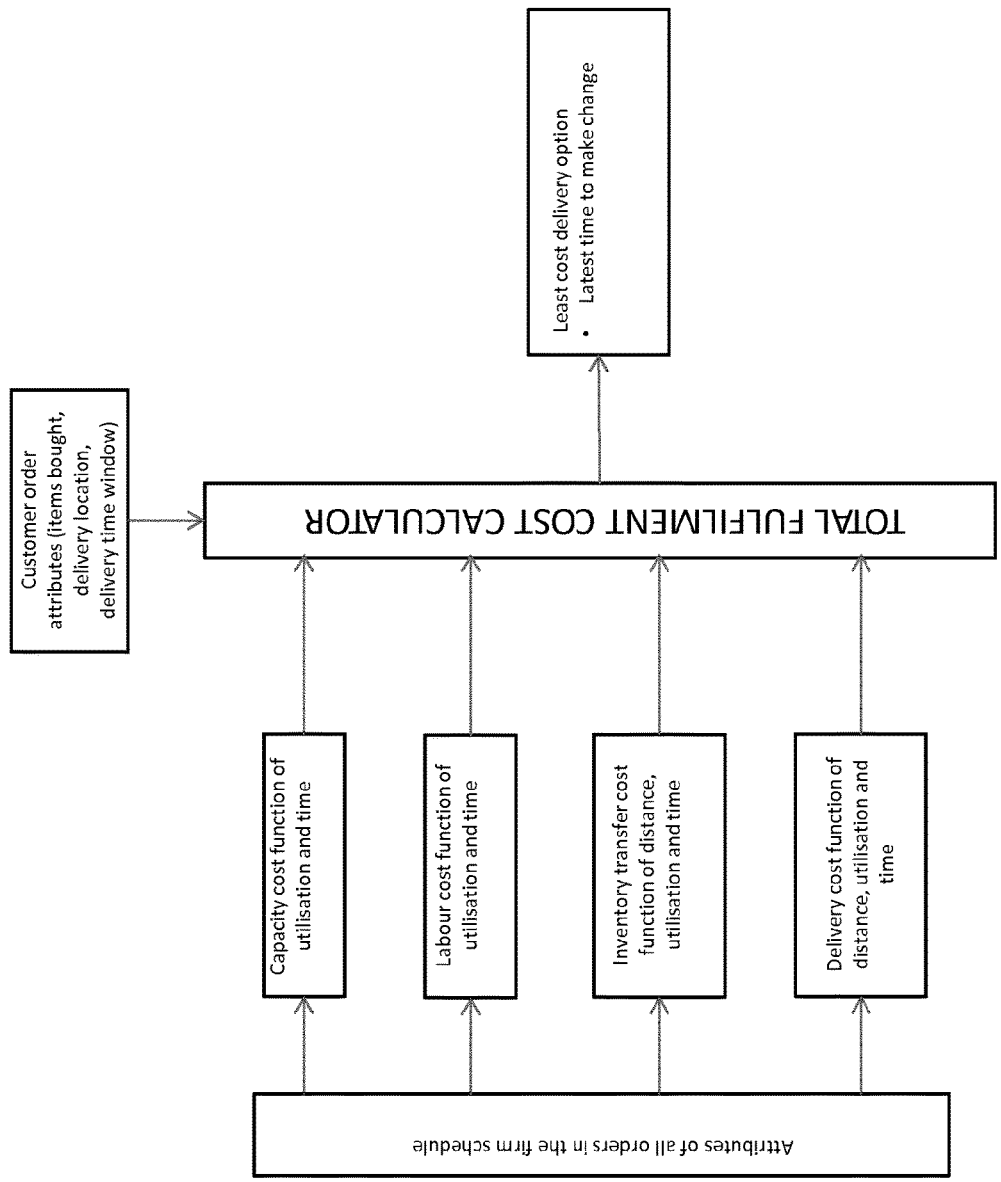
FIG. 8 is a flow chart showing some example steps that may be taken in calculating a total fulfillment cost, according to some embodiments.

FIG. 8 is a flow chart showing some example steps that may be taken in calculating a total fulfillment cost, according to some embodiments.

In planning the fulfillment of customer orders, the decision about which resources to use and in particular on whether to fulfil from one or more large fulfillment centre(s) 102a, 102n or one or more small fulfillment centre(s) 104a, 104n may preferentially be made ahead of time.

In some embodiments, the system may utilize schedule and/or otherwise reserve resources for use, and also to take into consideration the expected capacity and/or other future-state information available within the system. The fulfillment decision support system 100 may issue commands and/or recommendations to pre-emptively move product in anticipation of expected orders.

The rules engine 412 may be configured to define, generate, modify, update and/or apply a set of logical rules. These logistical rules may be associated with various logistical elements, and when applied, may cause modifications to cost determinations and/or the prioritization of logistical options. For example, there may be a rule that fresh produce of a particular type needs to arrive to a customer within a period of 5 days from receipt of shipment from a supplier at a large fulfillment centre 102*a*. This rule may cause various options to either cost more, or not be applicable in view of the constraint.

The future state prediction subsystem 414 may be configured for developing predictions on anticipated logistical factors that may impact logistical decision-making. For example, anticipated orders, capacity, labour, customer demand, traffic patterns, etc. may be considered. The fulfillment optimisation subsystem 410 may utilise the predictions in optimising one or more cost functions associated with the various fulfillment options. For example, with a high anticipated demand for a particular product from a customer segment located near a first small fulfillment centre 104*a*, the fulfillment optimisation subsystem 410 may be more inclined to issue a recommendation to pre-emptively ship product to the small fulfillment centre 104*a*.

In some embodiments, the future state prediction subsystem 414 may be configured to consider various probabilities and/or dependencies. For example, the probabilities for different resources to be needed at different points in time may be considered. As customer orders arrive, or not, as may occur, these probabilities may change. During various stages of the optimisation process, the system may be configured to dynamically change one or more variables and/or parameters, though, for example, scheduling more or less labour or more or fewer delivery vehicles, for example. Accordingly, the related probabilities may be subject to change.

In some embodiments, future state prediction subsystem 414 may be configured for machine learning techniques based on historical and/or anticipated future state information. For example, the real cost of selected logistical options may be compared against the expected cost of the selected logistical options to determine the amount and reason for variation. Various factors may be adapted over time for refinement of recommendations and/or actions issued by the fulfillment decision support system 100. For example, the coefficients used for weighting various probabilistic options may be re-weighted upon analysis against real data following the fulfillment of the order.

The analytics subsystem 416 may be configured to provide various statistical analysis and reporting capabilities based on information stored at database 470. Reports may be generated on historical information and may involve various statistical techniques, data mining techniques, etc. The outputs of the analytics subsystem 416 may be provided to the future state prediction subsystem 414 for adaptation of the fulfillment decision support system 100 over time.

The labour optimisation subsystem 402 may be configured to receive information inputs from database 470 based on various attributes related to the status of labour at logistical operations and/or fulfillment centres, determine an expected labour cost function of an operation. Various logical rules may also be applied that may modify the determination, such as, indicating that the products include fragile items and may only be interacted with by a subset of workers who have special training, increasing the labour cost involved.

The labour optimisation subsystem 402 may be configured to take into consideration the current and/or anticipated utilisation of workers relative to their maximum utilisation. The labour optimisation subsystem 402 may take into consideration the types of costs associated with logistics, such as fixed costs, variable costs, unit costs, marginal costs, initial costs, etc.

For example, if a worker is tasked with a job that worker needs to be paid whether there is a job there to do or not, and as such, a fixed cost is incurred. If that worker is only needed half the time, adding more work may have no incremental cost as long as that worker has time/capability to do the work.

A decision to fulfil from a small fulfillment centre 104*a* may thus be based on the presumption that there is surplus picking labour available. While this presumption may be correct in some instances, there may be an unforeseen surge of customer demand at short notice, which could only be fulfilled from the small fulfillment centre 104*a* due to various factors, such as an expedited/early delivery requirement in the orders. If picking labour has already been allocated to fulfil orders which could have been fulfilled from the large fulfillment centre 102*a*, this surge of unforeseen demand may not able to be satisfied and the business opportunity costs may be significant. However, if this surge of demand does not materialise, fulfilling the order from the large fulfillment centre 102*a* could mean that other demand at the large fulfillment centre 102*a* could not be satisfied.

Figure 11:
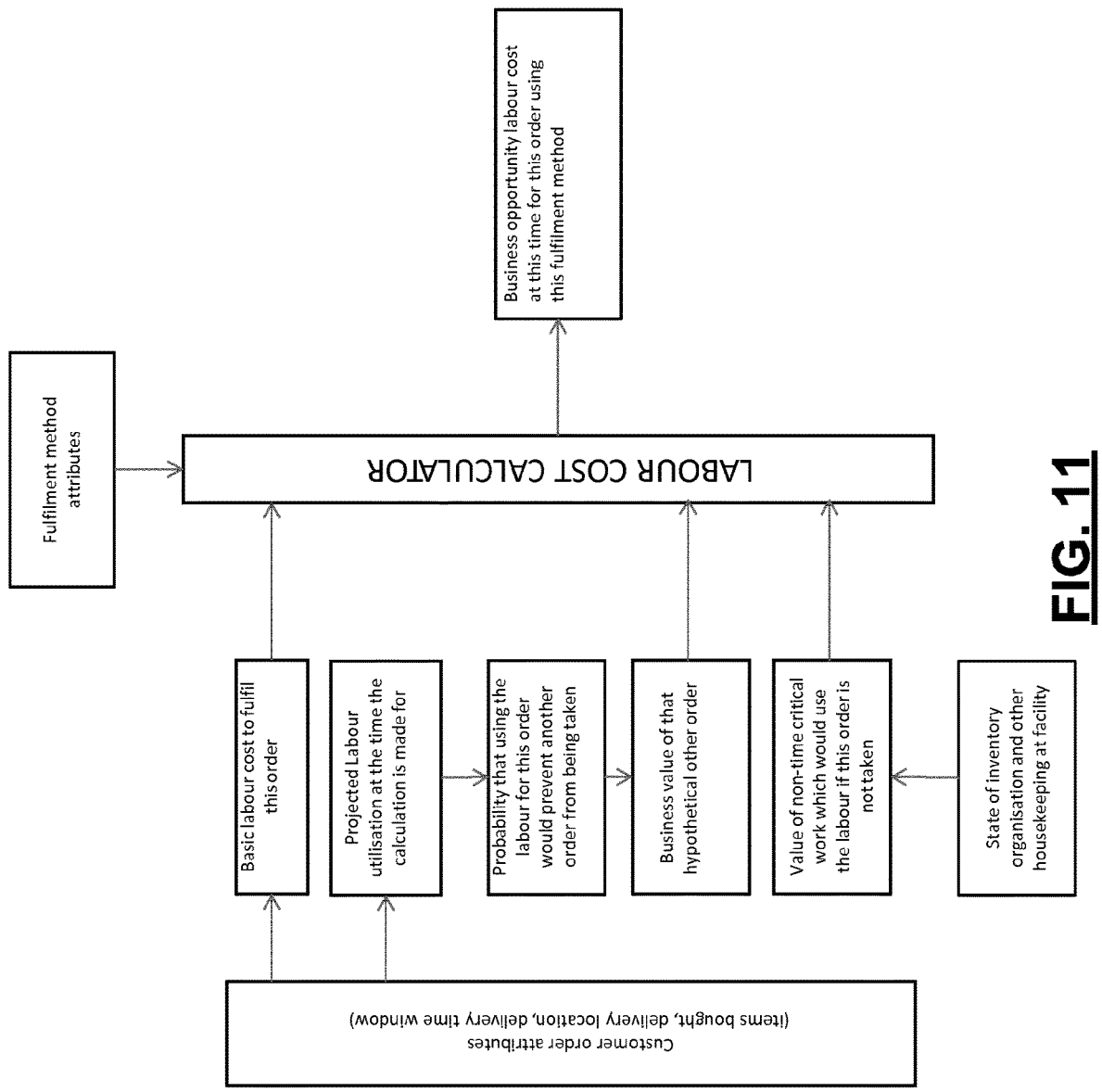
FIG. 11 is a sample workflow that may be utilised by a labour optimisation subsystem, according to some embodiments.

FIG. 11 is a sample workflow that may be utilised by a labour optimisation subsystem, according to some embodiments. The inputs and workflow elements are merely examples and there may be more, less, alternate or different elements.

The capacity optimisation subsystem 404 may be configured for determining a cost value associated with a logistics option. For example, the total available capacity of the system may be considered, with anticipated costs being greater where there is little available capacity, and anticipated costs being lower where there excess capacity may be utilised. For example, if a vehicle is scheduled to travel from A to B with half a load, the incremental cost of adding more goods to that vehicle may be considered zero. There may be other costs involved, such as the cost of added fuel, tyre wear etc, due to extra weight, etc. There may also be consideration of potential opportunity costs where excess capacity may be utilised for competing tasks.

A capacity cost may include various factors, such as the cost of owning and maintaining buildings, machinery and/or other equipment which enable a certain amount of throughput.

This cost may take into consideration the expected usage, maximum usage, flexibility in usage (for example, if a particular truck must be used for transportation as it has air-chilling capabilities), opportunity costs, fixed costs, variable costs, initial costs, operating costs, capital costs, marginal costs, operating hours, maximum operating hours, maintenance requirements, start-up costs, shut-down costs, etc.

Throughput may be considered from various contexts, such as throughput per hour, and may depend on factors such as operating time, machine speeds, temperatures, etc.

Figure 12:
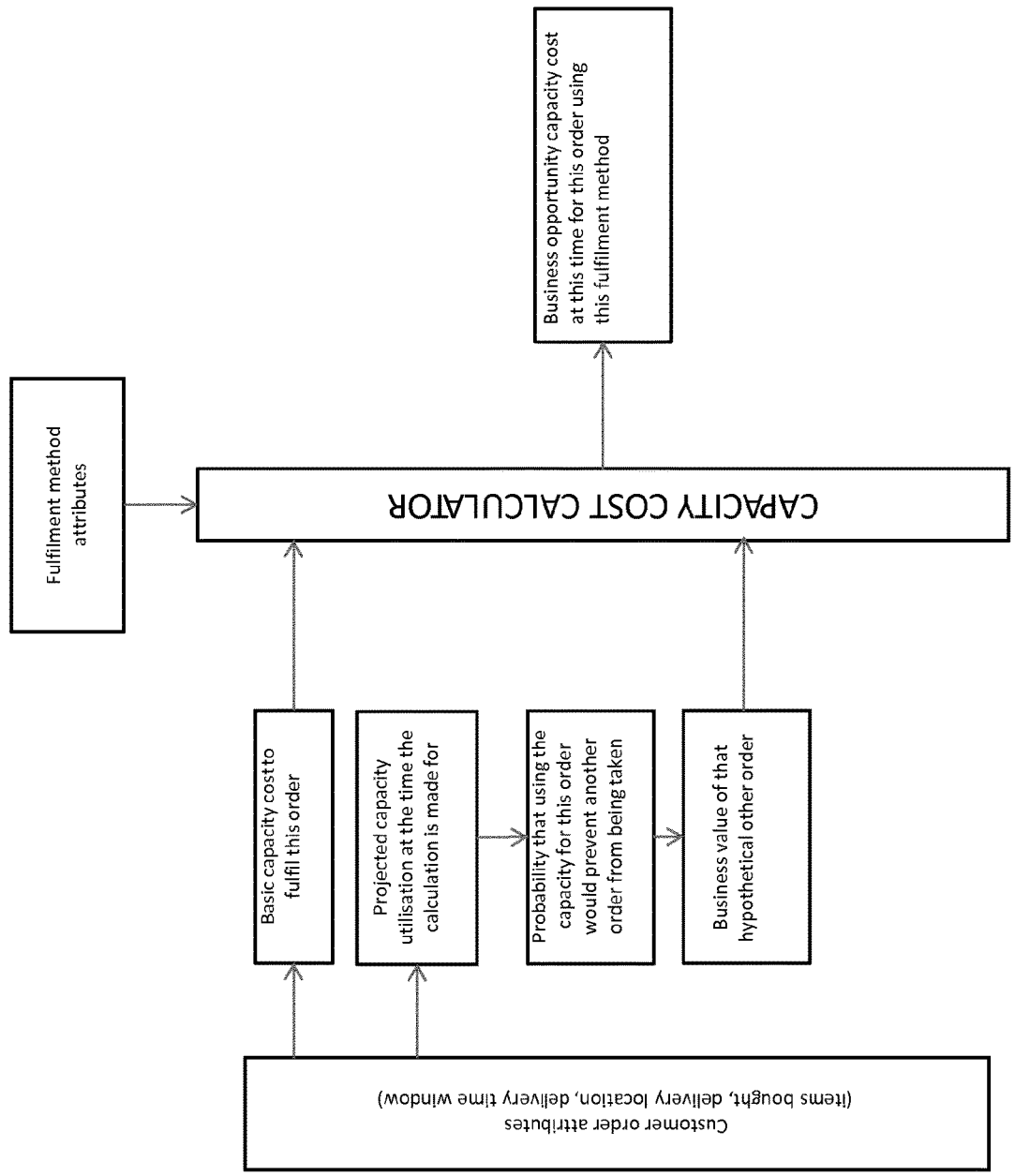
FIG. 12 is a sample workflow that may be utilised by a capacity optimisation subsystem, according to some embodiments.

FIG. 12 is a sample workflow that may be utilised by a capacity optimisation subsystem, according to some embodiments. The inputs and workflow elements are merely examples and there may be more, less, alternate or different elements.

The distribution cost optimisation subsystem 406 may be configured for determining a cost value associated with a logistics option.

A distribution cost may include the various costs involved in moving customer orders from the location they are received and/or picked to where the customer receives the order.

The distribution cost may include various costs associated with the distribution of products, such as the cost of provisioning vehicles, unloading vehicles, loading vehicles, preparing containers, picking containers, pickup counter costs, any applicable duties, fuel costs, driver costs, bulk sizing of products, product weight, internal logistical costs inside the fulfillment centres, required labour, storage costs, administrative costs, packaging costs, etc. The distribution cost optimisation subsystem 406 may apply rules from rules engine 412 where rules are applicable to modify a cost, such as a constraint on timing for perishable goods.

Figure 13:
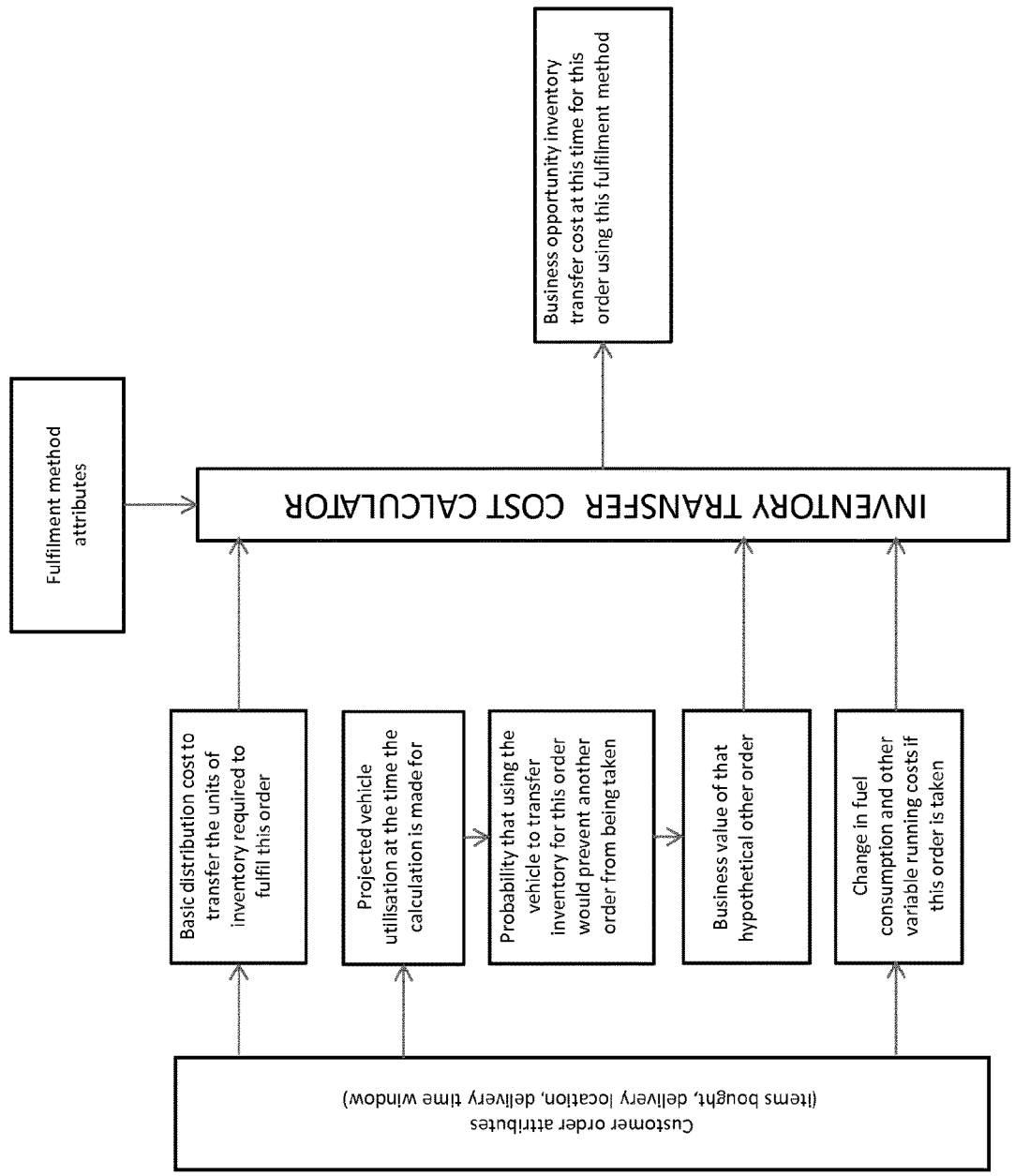
FIG. 13 is a sample workflow that may be utilised by an inventory transfer cost optimisation subsystem, according to some embodiments.

FIG. 13 is a sample workflow that may be utilised by distribution cost optimisation subsystem, according to some embodiments. The inputs and workflow elements are merely examples and there may be more, less, alternate or different elements.

The inventory transfer cost optimisation subsystem 408 may be configured for determining a cost value associated with a logistics option.

Inventory transfer cost may be the cost of moving product from one location to another, prior to picking the customer order. For example, products may be moved in anticipation of future orders, or picked to be fulfilled at another fulfillment centre.

The inventory transfer cost may include various costs associated with transferring inventory between fulfillment centres, such as the cost of provisioning vehicles, unloading vehicles, loading vehicles, preparing containers, picking containers, pickup counter costs, any applicable duties, fuel costs, driver costs, bulk sizing of products, product weight, internal logistical costs inside the fulfillment centres, etc.

The inventory transfer cost optimisation subsystem 408 may apply rules from rules engine 412 where rules are applicable to modify a cost, such as a constraint on timing for perishable goods.

Figure 14:
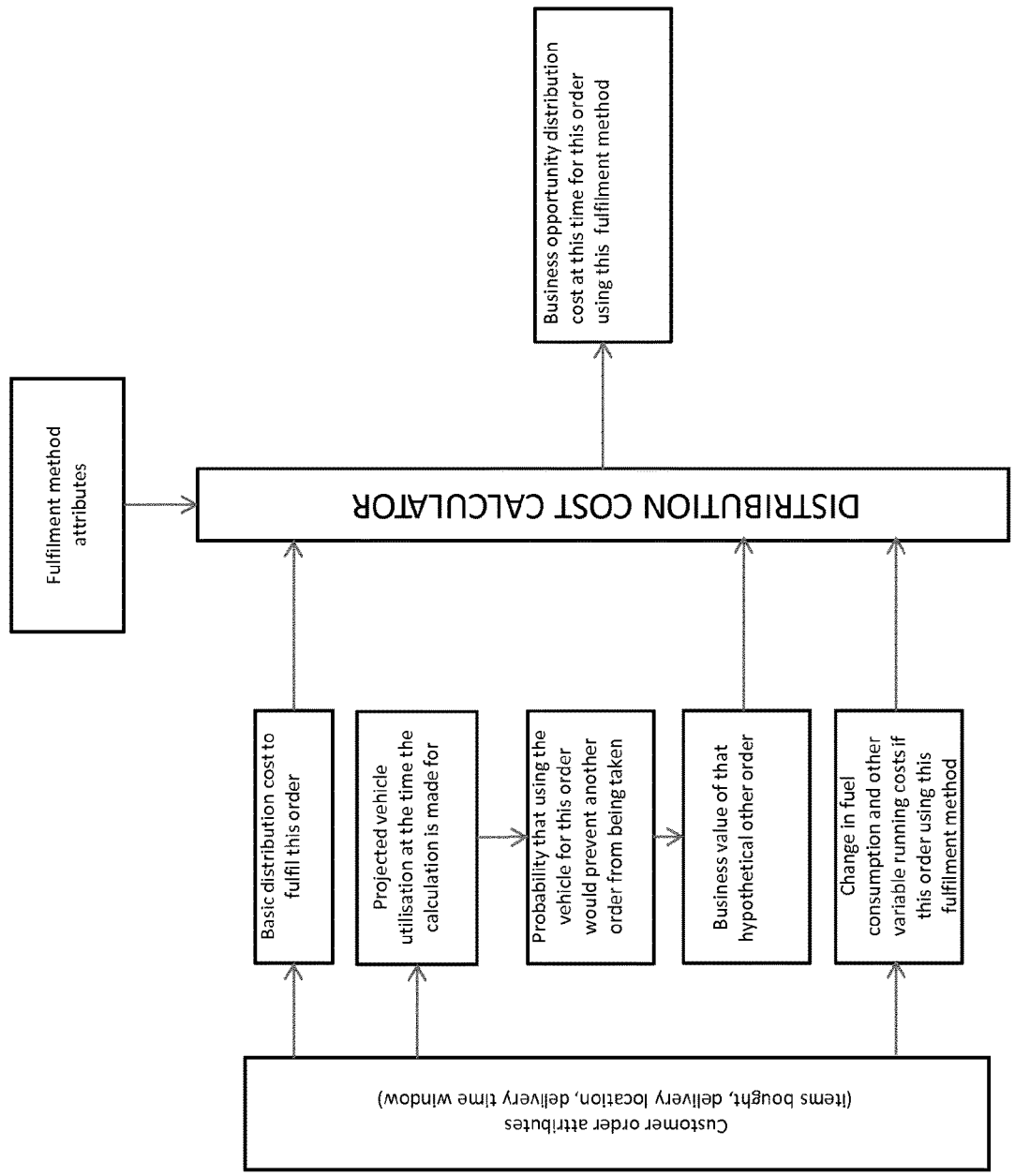
FIG. 14 is a sample workflow that may be utilised by an distribution cost optimisation subsystem, according to some embodiments.

FIG. 14 is a sample workflow that may be utilised by an inventory transfer cost optimisation subsystem, according to some embodiments. The inputs and workflow elements are merely examples and there may be more, less, alternate or different elements.

Some costs described herein may be calculated in advance of customer orders. Some costs may be calculated continually as new data such as new data relating to orders received from customers, or predicted orders become available. Some costs may be calculated continually as new data is received from the fulfillment centre (e.g. relating to monitored inventory levels), or as new data is received from third parties (e.g. supplies). For example, marginal costs and opportunity costs associated with selecting a fulfillment option may vary over time, based on real-time data relating inflow and attributes of orders and the corresponding probabilities of numbers and attributes of predicted orders.

The decision support subsystem 418 may be configured to receive costs associated with various logistical options from fulfillment optimisation subsystem 410 and issue recommendations, actions and/or reservations to various systems integrated with the fulfillment decision support system 100.

The decision support subsystem 418 may be configured to receive costs associated with various returns associated with customer orders and issue recommendations, actions and/or reservations to various systems integrated with the fulfillment decision support system 100.

With regard to the general discussion above of the decision support system 100 a specific embodiment in accordance with the invention will now be described. It will be appreciated that this embodiment is an example only and aspects of the invention as described with reference to the specific embodiment may be undertaken in a different manner whilst still being encompassed within the general scope of the invention.

1. Specific Embodiment of a Decision Support System 100

Figure 16:
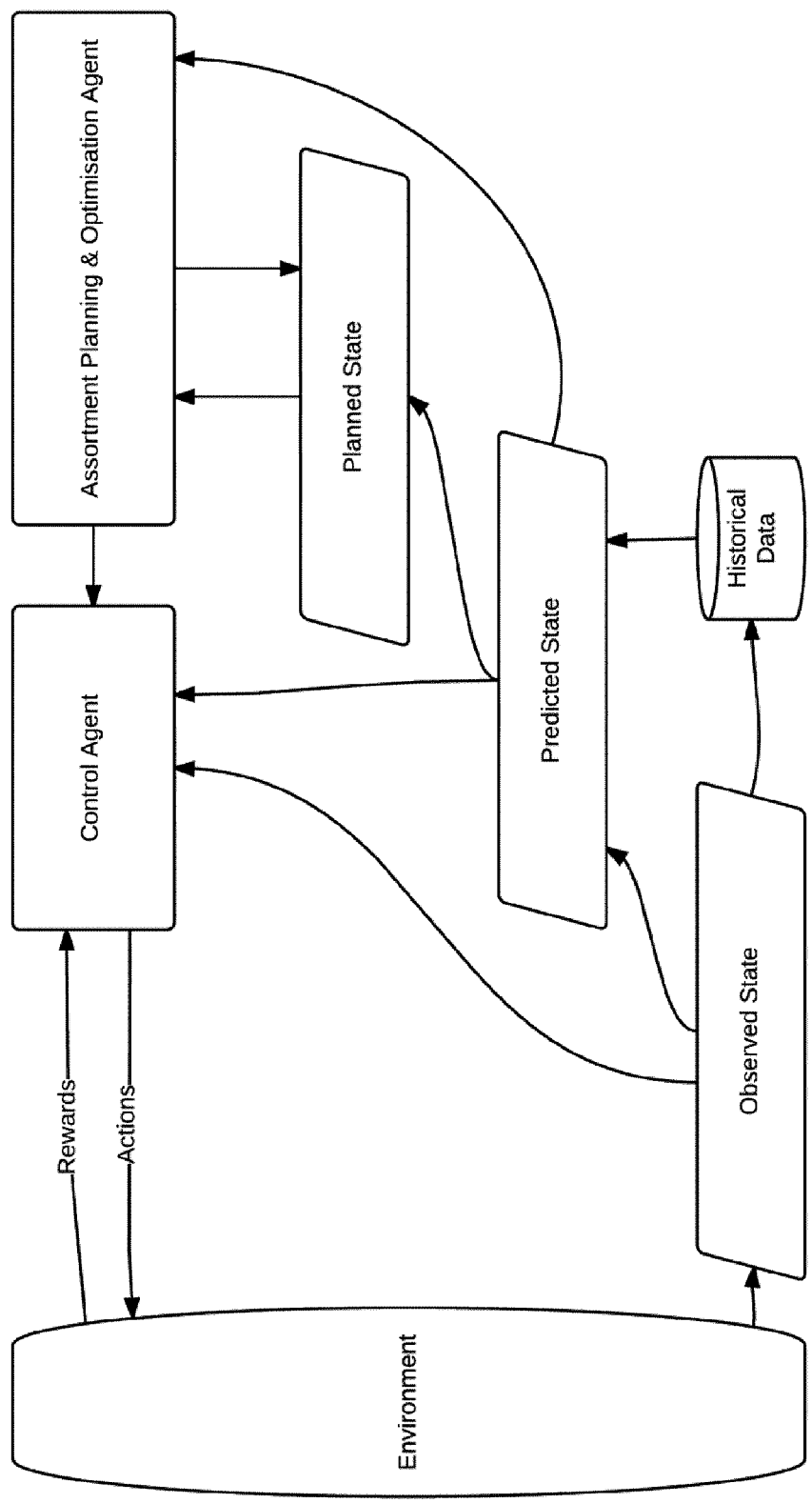
FIG. 16 shows an exemplary embodiment disclosed herein with a functional block diagram of assortment planning and optimisation with a control agent.

Referring to FIG. 16, one embodiment of the invention is described. It will be appreciated that parts common to the general description of the invention and the specific embodiment will be referred to using the same reference numerals.

1.a Control System Requirements

It should be noted that although the disclosed invention allows for the positioning of small fulfillment facilities close to the customer, potentially reducing order placement to delivery latency and delivery costs, for optimal utilisation the pairing of large and small fulfillment requires a more sophisticated decision making process in two key regards:

1) On the "inbound" side, decisions are required as to:
  a) what assortment of goods will be held at the small fulfillment facilities,
  b) how much stock will be held at each fulfillment facility (including inter-facility stock transfers), and
  c) where stock should be received and optionally decanted into standardised containers, which may be different from the facility where the stock is ultimately used for fulfillment.
2). on the "outbound" side, decisions are required as to:
  a) which fulfillment facility should assemble each order, and
  b) which stock should be used to fulfil each part of an order, where the stock selected may be stored at a different facility.

In this specific embodiment of one form of the invention there is disclosed an illustrative, non-exhaustive range of control scheme variants for making these determinations. For clarity only, the inbound and outbound sides of the decision making process are handled separately. It will be appreciated that the two processes may be interlinked in some aspects of the invention, and it should be noted that all of the control algorithms discussed apply as well to a compound cost function spanning both domains as they do to separate cost functions for each domain.

2. Control System Agent Composition

In the following sections, in one embodiment of the invention the notion of a control agent is introduced by looking in turn at (1) the agent's "state" or how the agent models its environment; and (2) an illustrative set of cost functions encoding business/operational logic that some agent embodiments might use to make decisions.

2.a System State

The control system agent may be viewed as decision making process that, based on the state of the system, decides what action(s) to take. Here the action primarily concerned with is the decision about whether to accept an order and for accepted orders with which facility to fulfil them. The state of the system may further be subdivided into several classes:

1) "observable" state—the directly observable current state of the system e.g. current stock levels at each facility.
2) "predictive" state—some embodiments may use statistical models fitted to historical or external data sources to provide probabilistic estimates of quantities of interest that are not yet known or not directly observable e.g. customer demand for goods at a future point in time.
3) "planned" state—some embodiments may engage in planning i.e., making speculative decisions and simulating the cumulative effects of those decisions to refine estimates of predictive state and/or calculate the resulting future observable state. For example, the agent could speculative assign a set of customer orders to be fulfilled at various facilities in order to evaluate the associated cost of such a configuration.

Taking each of these states in turn and looking at issues that affect each of the states:

2.a.i Observable State
1) Available labour by facility
2) Existing stock levels associated expiry dates in facilities
3) Capacity constraints 2.a.ii Predictive State
1) Demand Forecast—Any decision about the quantities of which goods to store at each fulfillment facility necessarily begins with a predictive model of the demand for goods from that facility. In a typical embodiment, these predictions could be produced from time series data of historical demand patterns using a model from the autoregressive, exponential smoothing, or dynamic linear families of models. In some cases, greater accuracy is obtained by using ensemble techniques and a plurality of models. In some cases it is desirable to have as a description of predicted demand full probability distributions. In those cases, and for models that emit only point estimates, those models can be run repeatedly over bootstrapped historical data.

2.a.iii Planned State
1) Assignment of orders to facilities.
2) Transfer of inventory across facilities.
3) Stock forecast incorporating ordering constraints (e.g. ordering opportunities, truck fill constraints, minimum buying quantities, buying multiples, maximum buying quantities, etc. planned customer order-facility assignments, and inventory transfers.

2.b Cost Functions

All cost functions (as, for example in the cost functions below) can be expressed in the same units (in this case monetary) which then allows them to be summed together into an overarching cost function. This overarching cost function may then be used to evaluate the desirability of a particular assignment of a set of customer orders to facilities, or similarly the delta change in such a function could be used to evaluate the desirability of making a specific facility/ies assignment of a single order against a backdrop of facilities assignments of other orders held fixed.

2.b.i Inbound Domain

Within the inbound domain several sets of constraints are likely to apply:
1. Ordering constraints e.g. some suppliers may only be willing to ship to a given facility at specific times/on specific days, only ship a full lorries worth of goods ("truck fill" constraints), minimum quantities of stock for each SKU, round shipping cases worth of stock per SKU ("buying multiples"), and/or limit the amount of stock of a given SKU orderable at one time/within a period of time. Further, not all suppliers will be willing to serve all facilities. For example, it may be that a small supplier is only willing to serve the nearest facility, or that another supplier's goods are collected just-in-time, on-route by delivery vehicles and although that supplier's goods are part of the available assortment to customers served by a facility, that supplier's goods do not actually pass through that facility.
2. Facility storage constraints—each facility will have a predetermined capacity for storing a number of containers of each available type.

In the simplest case, all facilities would offer the same assortment of products (SKUs). It may be desirable that smaller facilities offer only a subset of the goods available at larger facilities e.g. if it was advantageous or necessary for supplier deliveries to occur only to the larger facilities. In some implementations, each facility may offer its own individual subset of whole range, with supplier deliveries occurring to one or more, but not necessarily all of the facilities in the network that offer a particular product.

In the more general cases, an agent could use several sources of data to optimise its decision making about assortment planning at each facility:
1. Forecasted demand for each SKU (assuming availability).
2. Customer impact—the impact to customers served by a particular facility of not stocking a portion of the possible range can be quantified by estimating how well the portion of the possible range that is stocked substitutes for the lines not stocked. In particular, the pairwise negative correlation of a set of SKUs which collectively have high occurrence in customer baskets may indicate good substitutability. If customers are able to reject substitutes then high rejection rates would indicate poor substitutability.

Once the desirability of having a particular assortment at each facility can be quantified, standard algorithms can then be used to optimise the assortment at each facility. For small problem instances, exact solution methods including dynamic programming or mixed integer linear programming may suffice. More often, metaheuristic techniques like simulated annealing or genetic algorithms will be required to generate approximately optimal solutions.

2.b.ii Inbound Cost Model
2.b.ii.1 Labour

Whilst this is given for a single facility, this naturally extends to multiple facilities by simply repeating the calculation with the correct parameter values for each facility in turn and summing the resulting costs.

$R_{min}$=the minimum number of regular employees who may be rostered for a given shift e.g. due to contractual requirements.

$R_{max}$=the maximum number of regular employees who may be rostered for a given shift e.g. due to labour availability.

$R_{cost}$=the cost per regular employee shift.

$T_{max}$=the maximum number of temporary workers who may be rostered for a given shift.

$T_{cost}$=the cost per temporary employee shift.

$L_{req}=L_{facility}$ (vehicles, SKUs, containers, cases, weight, eaches)=the number of people required during a given shift; for example, it may be possible to determine this using a facility specific function of the number of vehicles to be unloaded, the number of distinct SKUs to be received, the number of containers required to hold the incoming stock, the number of cases being delivered, the total weight and number of eaches of the goods to be received and placed into standardised containers.

Then the inbound labour cost component may be calculated as:

$$IL_{cost}=R_{req}*R_{cost}+T_{req}*T_{cost}$$

where $R_{req}$ and $T_{req}$ give the required regular and temporary labour respectively:

$$R_{req}=\text{MIN}(R_{max},\text{MAX}(R_{min},L_{req}))$$

$$T_{req}=\text{MIN}(T_{max},\text{MAX}(0,L_{req}-R_{req}))$$

It will be appreciated that separate variants of this calculation might be done for each job role and those results summed together.

It should be noted that, if labour is a shared pool across inbound and outbound operations, this labour cost function in the Inbound Domain may interact and affect the Outbound Domain cost function components in some embodiments.

2.b.ii.2 Customer Impact

This may be considered as a function of expected shorts, namely the failure to fulfil some or part of an order and customer or operational substitutions namely where an alternative product is supplied in place of an ordered product.

2.b.ii.3 Inventory Transport

For a given vehicle type, which may be considered and/or selected based on weight and number of containers to move, distance of journey or route, and expected journey time given expected traffic, allowable road speeds, etc. it is possible to calculate driver cost, and this may include the ability to pro rata vehicle depreciation and maintenance, expected fuel consumption and cost, etc. Furthermore, it may be possible to incorporate a cost attributable to whether or not the vehicle is already returning to where it came from and potentially rather empty.

For each facility or fulfillment centre there will be uncommitted goods available, and shortfall goods required. It is therefore possible to find the minimum cost set of inventory transfers required that minimise purge and shortfall (though the actual cost of those may be captured under Customer Impact and Expected Purge) in the presence of constraints on vehicle and driver availability at each candidate source location. Accordingly:

2.b.ii.4 Expected Purge

For a specific SKU, given:

$P_{cost}$=the cost to pick an each of that SKU.
$E_{cost}$=the cost of an each of that SKU.
Peaches=a (possibly random) variable giving the quantity of the SKU purging then the expected purge cost could be calculated as:

$$EP\text{cost}=(P\text{cost}+E\text{cost})*Peaches$$

It should be noted that order-facility assignments change demand pattern across facilities and so could impact Customer Impact, Inventory Transport, and Expected Purge with Outbound Domain cost function components in some embodiments.

2.b.iii Outbound Domain
Order-Facility Assignment.
2.b.iii.1 Facility

The costs attributable to the facility may be referred to as "capacity cost". The fixed depreciation cost of the building and equipment+lease+variable non-labour operating expenses of the building e.g. heat and electricity utility costs may all be taken in to account in this variable.

2.b.iii.2 Inventory Transfer

This may be considered to be substantially the same as the Inventory Transfer cost function component within Inbound Domain referred to above.

2.b.iii.3 Labour

This may be considered to be substantially the same as the Labour cost function component with Inbound Domain referred to above except with:

1. $L_{req}=L_{facility}$ (vehicles, orders, containers, eaches)=the number of people required during a given shift as a function of delivery vehicles to be loaded, orders to be fulfilled, containers required for those orders, and number of eaches needing to be picked for those orders; and
2. $IL_{cost}$ instead being named $OL_{cost}$ (Inbound Labour vs. Outbound Labour).

2.b.iii.4 Distribution

Random Variables

1) $C_{route}$=the anticipated cost in GBP for delivery van routes operating in the prospective order's geographic area, for the requested delivery day and time, from the prospective facility, potentially including staff pay, vehicle depreciation, fuel cost, etc.
2) $T_{avail}$=the distribution of total available drive times for delivery van routes operating in the prospective order's geographic area, for the requested delivery day and time, from the prospective facility.
3) $W_{avail}$=the distribution of weight carrying capacities for delivery van routes operating in the prospective order's geographic area, for the requested delivery day and time, from the prospective facility.
4) $V_{avail}$=the distribution of van capacities measured in standardised containers for delivery van routes operating in the prospective order's geographic area, for the requested delivery day and time, from the prospective facility.
5) $T_{order}$=the empirical distribution of the averages of the observed historic drive time to deliveries from the prior drop, and from deliveries to the subsequent drop for deliveries which occurred in the same geographic region, on the same day of week, and during the same time period of the day as the prospective order.
6) $W_{order}$=the distribution of possible weights of the prospective order predicted by (for example), the current basket contents, the historical weights of this customer's orders at delivery and at intervals from order creation up to delivery, and the remaining time until requested delivery.
7) $V_{order}$=the distribution of possible order volumes measured in standardised containers of the prospective order predicted by (for example), the current basket contents, the historical weights of this customer's orders at delivery and at intervals from order creation up to delivery, and the remaining time until requested delivery.
8) $M_{order}$=the distribution of possible order profit margins of the prospective order predicted by (for example), the current basket contents, the historical margin of this customer's orders at delivery and at intervals from order creation up to delivery, and the remaining time until requested delivery.

Given the above exemplary variables, the delivery component of the opportunity cost of accepting a particular order may be modelled as:

$$C_{order}=C_{route}*\text{MAX}(T_{order}/T_{avail},W_{order}/W_{avail},V_{order}/V_{avail})$$

In some implementations $V_{order}$ and $V_{avail}$ may be subdivided into categories to capture e.g. the requirement that parts of orders require handling in different temperature regimes. In some implementations the estimate's accuracy may be improved by relying not only on historical data but using knowledge of other relevant (close in space and time) orders already accepted for fulfillment and delivery to modify estimates (based on the historic data) of incremental drive time requirements or expected available weight or volume capacity.

In some implementations retail and cost prices may vary by facility location, in which case $M_{order}$ divided by $C_{order}$ could be used as the relevant metric in place of $C_{order}$ alone.

In some implementations calculation of the relevant metric ($C_{order}$ or $M_{order}/C_{order}$) may be performed speculatively before offering delivery options to customers. In this case customer demand for slots could be managed by a number of mechanics: altering delivery charges, masking slots out as unavailable, offering different delivery options first or otherwise altering the order of display, highlighting some delivery options visually e.g. with a green van icon, etc., encouraging the selection of slots where $M_{order}/C_{order}$ is e.g. above average rather than below average. In this case the impact on the customer experience could be minimised by allowing customers to specify their flexibility with regards to delivery options or allowing them to select less specific delivery times (e.g. a two hour instead of one hour delivery window possibly for a reduced delivery charge). Additionally a customer's sensitivity to delivery charges, time from order placement to delivery and slot availability on different days of the week and at different times of day could be inferred from their prior delivery slot selection behaviour. Slot demand management can then be moderated accordingly on a personalised basis.

3. Decision Making Algorithms

In the examples given below, facility assignment of a customer order is understood to encompass a compound decision: for example, which facility or fulfillment centre a customer order should despatch from, as well as the facility or multiple facilities that single customer order may be picked at.

1) Greedy—use cost functions or incremental changes thereof to select optimal facility assignment for each accepted customer order with configurable thresholds to reject orders that are deemed too costly or adjust the delivery charge to make the order more commercially viable.
2) Heuristic—use rules based on state and/or cost functions to select facility assignment for each accepted customer order that will hopefully result ultimately in a globally optimal assignment of customer orders to facilities.
3) Optimisation—using standard approaches to approximate combinatorial optimisation (e.g. simulated annealing, genetic programming, cross entropy method, etc.) attempt to directly construct an optimal assignment of customer orders to facilities.
4) Reinforcement Learning (RL)—using an observable reward function e.g. total gross margin minus operating cost, learn an optimal policy within the environment modelled by Markov Decision Process (MDPs) for taking actions. That is the previously mentioned state S at time t is a function of the previous state S at the time t−1. The actions could be at the global level selecting facility assignments or rejecting orders or adjusting the delivery charge to make the order more commercially viable or dynamically adapting the pricing of the goods in the order. The actions could also be facility level, selecting whether or not to accept an order, as well as requesting and sending stock to other facilities. The policy may or may not be learned directly e.g. using deep Q learning, may or may not involve learning as an intermediary step a function for valuing states e.g. via temporal difference learning, and may or may not incorporate the use of planning and simulation. The learning of the optimal policy may or may not be bootstrapped by using off-policy learning to learn from another previously mentioned decision making process.

In the specific embodiments of cost functions and algorithms described and discussed above, it will be appreciated that all or some of the variables may be used and a Cost Function calculated based on some or all of the above. As a result of the Cost Function calculated the cost of fulfilling customer order in any number of ways may be calculated and the optimum for a given situation selected. It will be appreciated that the optimum may be defined depending on any of the variables discussed above and need not mean the cheapest financially but may, for example, mean the Cost Function with the lowest impact on other customer orders in the system.

It will also be appreciated that the list of variables and functions referred to above are not limiting and additional variables and functions may be envisaged that fall within the scope and spirit of the invention as claimed.

General

The embodiments described interact with various objects in the physical world, such as logistical equipment, warehouses, physical product, physical containers, etc. There may be commercial advantages to such optimisation, such as reduced costs, increased margins, increased product selection, shorter customer order lead times, increased logistical option selection, greater efficiency, reduced environmental impact, etc.

With respect to computer-implemented embodiments, the description provided may describe how one would modify a computer to implement the system or steps of a method. The specific problem being solved may be in the context of a computer-related problem, and the system may not be meant to be performed solely through manual means or as a series of manual steps. Computer-related implementation and/or solutions may be advantageous in the context of some embodiments; at least for the reasons of providing scalability (the use of a single platform/system to manage a large number of inputs and/or activities); the ability to pull together quickly and effectively information from disparate networks; improved decision support and/or analytics that would otherwise be unfeasible; the ability to integrate with external systems whose only connection points are computer-implemented interfaces; the ability to achieve cost savings through automation; the ability to dynamically respond and consider updates in various contexts (such as quickly changing order flow or logistical conditions); the ability to apply complex logical rules that would be infeasible through manual means; the ability for orders to be truly anonymous; among others.

Using electronic and/or computerised means can provide a platform that may be more convenient, scalable, efficient, accurate, and/or reliable than traditional, non-computerised means. Further, systems may be computerised and the platform may advantageously be designed for interoperability, and manual operation may be difficult and/or impossible. Further, manual operation, even if feasible, is unlikely to achieve comparable efficiency and/or Scalability may be useful as it may be advantageous to provide a system that may be able to effectively manage a large number of inputs, outputs and/or interconnections and/or integration with external systems.

The convenience and effectiveness of a solution may be valuable in the context of order fulfillment as individuals may have more information available to make better ordering and/or fulfillment decisions.

Figure 15:
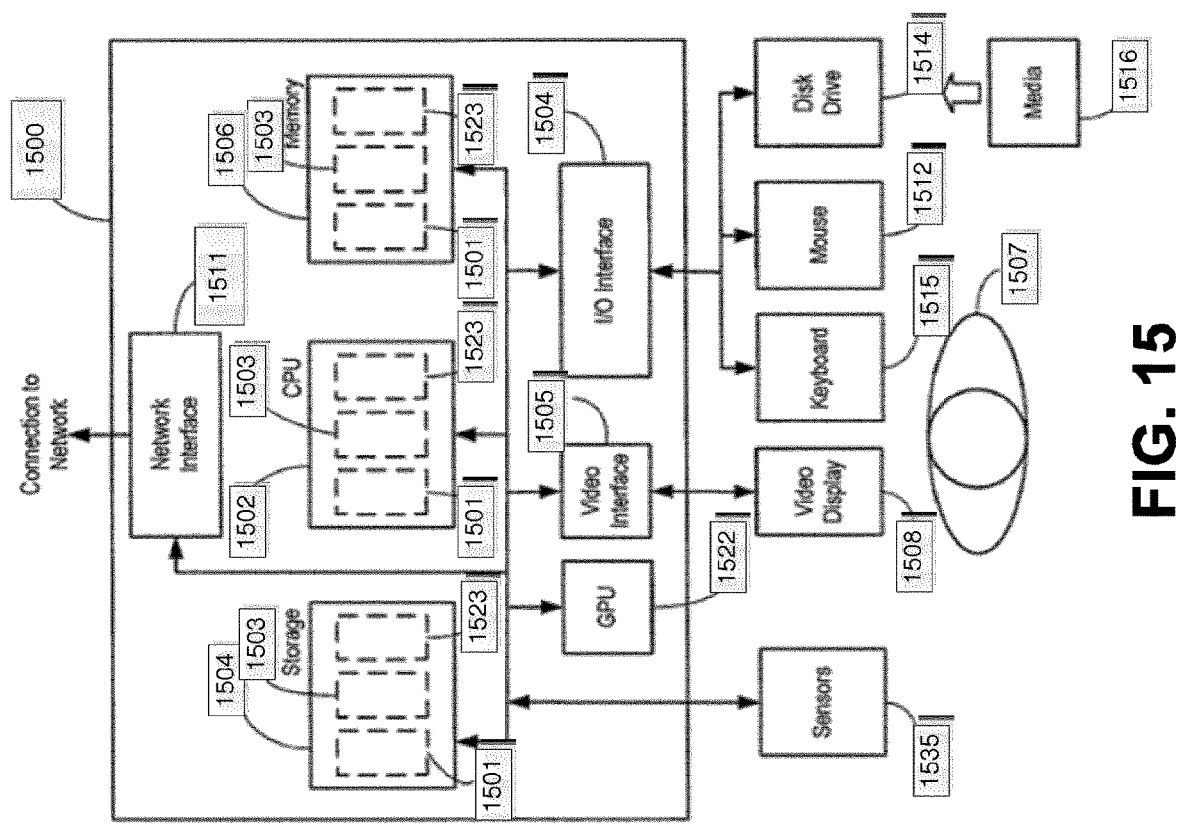
FIG. 15 is a schematic diagram illustrating a computer device, and associated communications networks, devices, software and firmware that may be configured to provide a platform for enabling one or more embodiments as described above.

The present system and method may be practiced in various embodiments. A suitably configured computer device, and associated communications networks, devices, software and firmware may provide a platform for enabling one or more embodiments as described above. By way of example, FIG. 15 shows a computer device 1500 that may include a central processing unit ("CPU") 1502 connected to a storage unit 1504 and to a random access memory 1506. The CPU 1502 may process an operating system 1501, application program 1503, and data 1523. The operating system 1501, application program 1503, and data 1523 may be stored in storage unit 1504 and loaded into memory 1506, as may be required. Computer device 1500 may further include a graphics processing unit (GPU) 1522 which is operatively connected to CPU 1502 and to memory 1506 to offload intensive image processing calculations from CPU 1502 and run these calculations in parallel with CPU 1502. An operator 1507 may interact with the computer device 1500 using a video display 1508 connected by a video interface 1505, and various input/output devices such as a keyboard 1515, mouse 1512, and disk drive or solid state drive 1514 connected by an I/O interface 1509. In known manner, the mouse 1512 may be configured to control movement of a cursor in the video display 1508, and to operate various graphical user interface (GUI) controls appearing in the video display 1508 with a mouse button. The disk drive or solid state drive 1514 may be configured to accept computer readable media 1516. The computer device 1500 may form part of a network via a network interface 1511, allowing the computer device 1500 to communicate with other suitably configured data processing systems (not shown). One or more different types of sensors 1535 may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

The mobile application of the present invention may be implemented as a web service, where the mobile device includes a link for accessing the web service, rather than a native application.

The functionality described may be implemented to any mobile platform, including the iOS™ platform, ANDROID™, WINDOWS™ or BLACKBERRY™.

It will be appreciated by those skilled in the art that other variations of the embodiments described herein may also be practiced without departing from the scope of the invention. Other modifications are therefore possible.

In further aspects, the disclosure provides systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be understood by those skilled in the relevant arts, with respect to both processes and any systems, devices, etc., described herein, a wide range of variations is possible, and even advantageous, in various circumstances, without departing from the scope of the invention, which is to be limited only by the claims.

The invention claimed is:

1. A method for processing orders to be fulfilled from a plurality of automated fulfillment centers of different sizes, the method comprising:
   receiving, in a fulfillment computing system including one or more subsystems of computing devices, an electronic order for one or more items over a network;
   identifying, via a rules engine of the fulfillment computing system, at least two potential options for fulfillment of the electronic order through one or more of the plurality of fulfillment centers, wherein the at least two potential options include fulfillment of the electronic order directly from inventory held at a first fulfillment center or fulfillment of the electronic order directly from inventory held at at least one second fulfillment centers having a size smaller than the first fulfillment center, and wherein identifying the at least two potential options comprises prioritizing a plurality of options including the at least two potential options based on a set of rules applied by the rules engine;
   computing, in one or more first subsystems of the fulfillment computing system, cost values for one or more of at least distribution costs, capacity costs, labor costs, and inventory transfer costs associated with each of the fulfillment centers;
   adjusting, in the one or more first subsystems of the fulfillment computing system, a cost function, which includes at least one of determined cost values for labor costs, capacity costs, distribution costs, and inventory transfer costs associated with each of the fulfillment centers;
   selecting, in a second subsystem of the fulfillment computing system, an option from the at least two potential options based on the adjusted cost function; and
   communicating, via the fulfillment computing system over the network, a data signal including the selected option to one or more logistical computing systems for fulfillment of the electronic order.

2. A method according to claim 1 comprising:
   transferring between fulfillment centers standardised containers containing products, said containers being storable in any of the plurality of fulfillment centers.

3. A method according to claim 1 comprising:
picking at the at least one second fulfillment centers a further product stored in a container; and
fulfilling a customer order having at least one product from at least one first fulfillment center and at least one product from at least one second fulfillment center having a size smaller than the first fulfillment center, said products being picked into one of the or each standardised container of the customer order.

4. A method according to claim 3 comprising:
picking said product in to the container transferred from each fulfillment center.

5. The method of claim 1, wherein each of the first and second containers is configured to be manipulated by an automated inventory management device.

6. The method of claim 5, wherein the picking comprises:
moving, at the first fulfillment center, at least one of first and second containers using the automated inventory management device.

7. The method of claim 5, wherein a container is selected from a set of standardised containers having one or more predefined sizes.

8. The method of claim 5, wherein each container is configured to be manipulated by an automated inventory management device.

9. The method of claim 5, comprising:
moving, at the second fulfillment center, the container using the automated inventory management device.

10. The method of claim 5, comprising:
picking, at the first fulfillment center, desired quantities of a plurality of products for packing, wherein the plurality of products are picked from and packed into a plurality of containers, wherein each of the plurality of containers is selected from a set of standardised containers having one or more predefined sizes.

11. The method of claim 1, wherein the desired quantities include:
quantities ordered by at least one customer to be fulfilled at the second fulfillment center; and
quantities predicted to be ordered by at least one customer and to be fulfilled at the second fulfillment center.

12. The method of claim 1, comprising:
fulfilling a customer order at the first fulfillment center using a packed container.

13. The method of claim 12, wherein the fulfilling comprises:
transporting the container to a customer.

14. The method claim 12, wherein the fulfilling comprises:
transporting the container to a collection point.

15. The method of claim 1, comprising:
transporting the container to the second fulfillment center.

16. The method claim 1, comprising: fulfilling a customer order at the second fulfillment center using at least one product transported in the container.

17. The method of claim 1, wherein the plurality of fulfillment centers includes a plurality of the second fulfillment centers.

18. The method of claim 17, wherein the plurality of second fulfillment centers are disposed around the first fulfillment center in a hub-and-spoke arrangement.

19. The method claim 1, comprising: predicting quantities to be fulfilled at the at least one second fulfillment center.

20. The method of claim 19, wherein said predicting is based on data relating to at least one of historical ordering information, promotional campaigns, introductions of new products, and extrapolation from pre-orders.

21. The method of claim 19, wherein the desired quantities include the quantities ordered by at least one customer and the quantities predicted to be ordered by at least one customer and to be fulfilled at the at least one second fulfillment center.

22. The method of claim 1, wherein the first and second products have different stock keeping unit numbers.

23. A system including one or more computing devices for processing orders to be fulfilled from a plurality of fulfillment centers of different sizes, the plurality of fulfillment centers including a first fulfillment center and a at least one second fulfillment center having a size smaller than the first fulfillment center, the system comprising:
at least one of the one or more computing devices encoded with at least an option selection module, the at least one computing device being configured to:
receive an electronic order for one or more items over a network;
identify at least two potential options for fulfillment of the electronic order through at least one of the plurality of fulfillment centers, wherein the at least two potential options include fulfillment of the electronic order directly from inventory held at the first fulfillment center or fulfillment of the electronic order directly from inventory held at the at least one second fulfillment center, wherein to identify the at least two potential options, a plurality of options including the at least two potential options are prioritized based on a set of rules;
compute a cost value for one or more of at least distribution costs, capacity costs, labor costs, and inventory transfer costs associated with each of the fulfillment centers;
adjust a cost function, which includes at least one of determined cost values for labor costs, capacity costs, distribution costs, and inventory transfer costs associated with each of the fulfillment centers;
select an option from the at least two potential options based on the adjusted cost function; and
communicate a data signal including the selected option to one or more logistical systems for fulfillment of the electronic order.

24. The system of claim 23, wherein the cost function is selected to evaluate at least one of labor costs, capacity costs, distribution costs, and inventory transfer costs, associated with each of the fulfillment centers.

25. The system of claim 23, wherein the cost function is selected to evaluate marginal costs associated with fulfilling the electronic order.

26. The system of claim 23, wherein the marginal costs are based on real-time data reflecting electronic orders received from customers and predicted electronic orders.

27. The system of claim 23, wherein the cost function is selected to evaluate opportunity costs associated with fulfilling the electronic order.

28. The system of claim 23, wherein the opportunity costs are based on real-time data reflecting electronic orders received from customers and predicted electronic orders.

29. The system of claim 23, wherein said selecting comprises:
determining at least one probability associated with availability of a particular resource.

30. The system of claim 23, wherein the particular resource is a labor resource, a transportation resource, or a storage resource.

31. The system of claim 23, in combination with a hierarchy of plural fulfillment centers which comprises:

the first fulfillment center; and a plurality of the second fulfillment centers having a size smaller than the first fulfillment center.

32. The system of claim 23, wherein the plurality of second fulfillment centers is disposed around the at least one first fulfillment center in a hub-and-spoke arrangement.

33. The system of claim 23, wherein the first fulfillment center comprises:

first products in first containers; and the at least one second fulfillment center comprises second products in second containers, wherein each of the first and second containers is selected from a set of standardised containers having one or more predefined sizes.

34. The system of claim 24, wherein the cost function is selected to evaluate marginal costs associated with fulfilling the electronic order.

35. The system of claim 24, wherein the marginal costs are based on real-time data reflecting electronic orders received from customers and predicted electronic orders.

36. The system of claim 24, wherein the cost function is selected to evaluate opportunity costs associated with fulfilling the electronic order.

37. The system of claim 24, wherein the opportunity costs are based on real-time data reflecting electronic orders received from customers and predicted electronic orders.

38. The system of claim 24, wherein said selecting comprises:

determining at least one probability associated with availability of a particular resource.

39. The system of claim 24, wherein the particular resource is a labor resource, a transportation resource, or a storage resource.

40. The system of claim 24, in combination with a hierarchy of plural fulfillment centers which comprises:

the first fulfillment center; and a plurality of the second fulfillment centers.

41. The system of claim 40, wherein the plurality of second fulfillment center is disposed around the first fulfillment center in a hub-and-spoke arrangement.

42. The system of claim 24, wherein the first fulfillment center comprises:

first products in first containers; and the at least one second fulfillment center comprises second products in second containers, wherein each of the first and second containers is selected from a set of standardised containers having one or more predefined sizes.

43. The system of claim 25, wherein the marginal costs are based on real-time data reflecting electronic orders received from customers and predicted electronic orders.

44. The system of claim 25, wherein the cost function is selected to evaluate opportunity costs associated with fulfilling the electronic order.

45. The system of claim 25, wherein the opportunity costs are based on real-time data reflecting electronic orders received from customers and predicted electronic orders.

46. The system of claim 25, wherein said selecting comprises:

determining at least one probability associated with availability of a particular resource.

47. The system of claim 25, wherein the particular resource is a labor resource, a transportation resource, or a storage resource.

48. The system of claim 25, in combination with a hierarchy of plural fulfillment centers, which comprises:

the first fulfillment center; and a plurality of the second fulfillment centers.

49. The system of claim 25, wherein the plurality of second fulfillment centers is disposed around the first fulfillment center in a hub-and-spoke arrangement.

50. The system of claim 25, wherein the first fulfillment center comprises:

first products in first containers; and the at least one second fulfillment center comprises second products in second containers, wherein each of the first and second containers is selected from a set of standardised containers having one or more predefined sizes.

51. The system of claim 25, wherein the cost function is selected to evaluate opportunity costs associated with fulfilling the electronic order.

52. The system of claim 26, wherein the opportunity costs are based on real-time data reflecting electronic orders received from customers and predicted electronic orders.

53. The system of claim 26, wherein said selecting comprises:

determining at least one probability associated with availability of a particular resource.

54. The system of claim 26, wherein the particular resource is a labor resource, a transportation resource, or a storage resource.

55. The system of claim 26, in combination with a hierarchy of plural fulfillment centers which comprises:

the first fulfillment center; and a plurality of second fulfillment centers.

56. The system of claim 55, wherein the plurality of second fulfillment centers is disposed around the first fulfillment center in a hub-and-spoke arrangement.

57. The system of claim 26, wherein the large fulfillment center comprises:

first products in first containers; and the at least one second fulfillment center comprises second products in second containers, wherein each of the first and second containers is selected from a set of standardised containers having one or more predefined sizes.

58. The system of claim 27, wherein the opportunity costs are based on real-time data reflecting electronic orders received from customers and predicted electronic orders.

59. The system of claim 27, wherein said selecting comprises:

determining at least one probability associated with availability of a particular resource.

60. The system of claim 27, wherein the particular resource is a labor resource, a transportation resource, or a storage resource.

61. The system of claim 27, in combination with a hierarchy of plural fulfillment centers which comprises:

the first fulfillment center; and a plurality of the second fulfillment centers.

62. The system of claim 61, wherein the plurality of second fulfillment centers is disposed around the first fulfillment center in a hub-and-spoke arrangement.

63. The system of claim 27, wherein the first fulfillment center comprises:

first products in first containers; and the at least one second fulfillment center comprises second products in second containers, wherein each of the first and second containers is selected from a set of standardised containers having one or more predefined sizes.

64. The system of claim 28, wherein said selecting comprises:
determining at least one probability associated with availability of a particular resource.

65. The system of claim 28, wherein the particular resource is a labor resource, a transportation resource, or a storage resource.

66. The system of claim 28, in combination with a hierarchy of plural fulfillment centers which comprises:
the first fulfillment center; and
a plurality of the second fulfillment centers.

67. The system of claim 66, wherein the plurality of second fulfillment center is disposed around the large fulfillment center in a hub-and-spoke arrangement.

68. The system of claim 28, wherein the first fulfillment center comprises:
first products in first containers; and
the at least one second fulfillment center comprises second products in second containers, wherein each of the first and second containers is selected from a set of standardised containers having one or more predefined sizes.

69. The system of claim 29, wherein the particular resource is a labor resource, a transportation resource, or a storage resource.

70. The system of claim 29, in combination with a hierarchy of plural fulfillment centers which comprises:
the first fulfillment center; and
a plurality of the second fulfillment centers.

71. The system of claim 70, wherein the plurality of second fulfillment centers is disposed around the large fulfillment center in a hub-and-spoke arrangement.

72. The system of claim 29, wherein the first fulfillment center comprises:
first products in first containers; and
the at least one second fulfillment center comprises second products in second containers, wherein each of the first and second containers is selected from a set of standardised containers having one or more predefined sizes.

73. The system of claim 30, in combination with a hierarchy of plural fulfillment centers which comprises:
the first fulfillment center; and
a plurality of the second fulfillment centers.

74. The system of claim 31, wherein the plurality of second fulfillment centers is disposed around the first fulfillment center in a hub-and-spoke arrangement.

75. The system of claim 30, wherein the first fulfillment center comprises:
first products in first containers; and
the at least one second fulfillment center comprises second products in second containers, wherein each of the first and second containers is selected from a set of standardised containers having one or more predefined sizes.

76. The system of claim 31, wherein the plurality of second fulfillment centers is disposed around the first fulfillment center in a hub-and-spoke arrangement.

77. The system of claim 31, wherein the first fulfillment center comprises:
first products in first containers; and
the at least one second fulfillment center comprises second products in second containers, wherein each of the first and second containers is selected from a set of standardised containers having one or more predefined sizes.

78. The system of claim 32, wherein the first fulfillment center comprises:
first products in first containers; and
the second fulfillment center comprises second products in second containers, wherein each of the first and second containers is selected from a set of standardised containers having one or more predefined sizes.

* * * * *